(12) United States Patent
Tanaka

(10) Patent No.: US 7,418,857 B2
(45) Date of Patent: Sep. 2, 2008

(54) AIR QUANTITY ESTIMATION APPARATUS FOR INTERNAL COMBUSTION ENGINE

(75) Inventor: Satoru Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 2 days.

(21) Appl. No.: 11/661,872

(22) PCT Filed: Sep. 1, 2005

(86) PCT No.: PCT/JP2005/016461

§ 371 (c)(1),
(2), (4) Date: Mar. 5, 2007

(87) PCT Pub. No.: WO2006/028157

PCT Pub. Date: Mar. 16, 2006

(65) Prior Publication Data

US 2007/0255483 A1     Nov. 1, 2007

(30) Foreign Application Priority Data

Sep. 6, 2004    (JP)    ............................... 2004-258741

(51) Int. Cl.
*G01M 15/00*     (2006.01)
(52) U.S. Cl. .................................................... 73/118.2
(58) Field of Classification Search .................... 73/112, 73/115, 116, 117.2, 117.3, 118.1, 118.2, 73/119 R
See application file for complete search history.

(56) References Cited

U.S. PATENT DOCUMENTS

| | | | | |
|---|---|---|---|---|
| 6,588,261 | B1 * | 7/2003 | Wild et al. ................. | 73/118.2 |
| 6,634,420 | B2 * | 10/2003 | Gokan et al. ................. | 165/157 |
| 7,079,937 | B2 * | 7/2006 | Tanaka ....................... | 701/102 |
| 2006/0116808 | A1 * | 6/2006 | Tanaka ....................... | 701/102 |
| 2007/0295067 | A1 * | 12/2007 | Rollinger et al. ........... | 73/118.2 |

FOREIGN PATENT DOCUMENTS

| | | |
|---|---|---|
| JP | A-06-026383 | 2/1994 |
| JP | A 2001-041095 | 2/2001 |
| JP | A-2001-516421 | 9/2001 |
| JP | A 2003-293821 | 10/2003 |
| JP | A 2004-108216 | 4/2004 |
| JP | A-2004-522055 | 7/2004 |
| JP | A 2004-245133 | 9/2004 |

* cited by examiner

Primary Examiner—Eric S McCall
(74) Attorney, Agent, or Firm—Oliff & Berridge, PLC

(57) ABSTRACT

This air quantity estimation apparatus includes models M2 to M7 which are configured on the basis of physical laws. The apparatus estimates pressure Pic and temperature Tic of air within the intercooler, by use of the compressor model M4 and the intercooler model M5, in consideration of a first energy Ecm, which a supercharger 91 (a compressor 91a) imparts to air supplied into an intercooler 45, and a second energy, which is exchanged between a wall of the intercooler and air within the intercooler. The apparatus estimates cylinder intake-air quantity KLfwd at a future point in time later than a present point in time based on the estimated pressure and the estimated temperature of air within the intercooler.

3 Claims, 11 Drawing Sheets

AIR QUANTITY ESTIMATION APPARATUS FOR INTERNAL COMBUSTION ENGINE

TECHNICAL FIELD

The present invention relates to an apparatus for estimating quantity of air introduced into a cylinder of an internal combustion engine.

BACKGROUND ART

In order to make an air-fuel ratio of gas mixture supplied into an internal combustion engine equal to a target air-fuel ratio, it is required to accurately estimate quantity of air which is introduced into a cylinder of the internal combustion engine (hereinafter, referred to as "cylinder intake-air quantity"). In a steady operation state where an opening of a throttle valve remains substantially unchanged, the cylinder intake-air quantity is accurately estimated based on a value output from an air flow sensor disposed in an intake passage of the internal combustion engine. Meanwhile, in a transition-operation state where the opening of the throttle valve rapidly varies, it is difficult to accurately estimate the cylinder intake-air quantity based on the value output from the air flow sensor, because time response characteristic of the air flow sensor is not sufficient. Therefore, it is required to estimate the cylinder intake-air quantity with better response than a case using the air flow sensor.

Further, fuel is generally injected before an end timing of an intake stroke. Meanwhile, the cylinder intake-air quantity is fixed (or becomes definite) at the end timing of the intake stroke (at an intake valve-closing timing). Therefore, the cylinder intake-air quantity has not become definite at a fuel-injection timing. Accordingly, in order to determine a fuel injection amount which makes the air-fuel ratio of the gas mixture to be formed in the cylinder equal to the target air-fuel ratio, it is required to estimate "the cylinder intake-air quantity at the intake valve-closing timing" at a predetermined timing before the fuel injection (i.e., before the end timing of the intake stroke).

As one of cylinder intake-air quantity estimation apparatuses which can satisfy such demands described above, Japanese Patent Application Laid-Open (kokai) No. 2001-41095 discloses an apparatus for estimating cylinder intake-air quantity at a future point in time later than a present point in time by use of a physical model which is modeled on a behavior of air flowing through the intake passage of the internal combustion engine.

According to the physical model which the disclosed apparatus uses, the estimated cylinder intake-air quantity at the future point in time later than the present point in time is represented by equations using pressure of air at a position upstream of the throttle valve (throttle valve upstream air) at the future point in time and temperature of the throttle valve upstream air at the future point in time. Therefore, unless the pressure and the temperature of the throttle valve upstream air at the future point in time are accurately estimated, the cylinder intake-air quantity at the future point in time cannot be accurately estimated.

Incidentally, since the above-mentioned internal combustion engine, to which aforementioned conventional apparatus is applied, is a naturally-aspirated engine, the pressure and the temperature of the throttle valve upstream air are approximately equal to those of atmosphere (or air). Further, the pressure and the temperature of atmosphere remains substantially unchanged within a short period of time from the present point in time to the future point in time when the cylinder intake-air quantity is to be estimated. Accordingly, the above-mentioned conventional apparatus accurately estimates the cylinder intake-air quantity at the future point in time, by employing the pressure of atmosphere and an intake air temperature detected by a temperature sensor disposed in the intake passage as the pressure and the temperature of the throttle valve upstream air, respectively.

However, if an internal combustion engine has a supercharger and an intercooler in order to improve its maximum output etc., air in the intake passage is compressed by the supercharger and is cooled by the intercooler. Therefore, the pressure and the temperature of the throttle valve upstream air (i.e., air within the intercooler) vary within the above-mentioned short period of time. Accordingly, in the internal combustion engine having the supercharger and the intercooler, it is difficult for the above-mentioned conventional apparatus to accurately estimate the cylinder intake-air quantity at the future point in time later than the present point in time.

SUMMARY OF THE INVENTION

The present invention has been accomplished in order to cope with the problem mentioned above. One of objects of the present invention is to provide an air quantity estimation apparatus for an internal combustion engine equipped with a supercharger, the apparatus being capable of estimating "cylinder intake-air quantity at a future point in time later than a present point in time" with high accuracy.

In order to accomplish the above-described object, the air quantity estimation apparatus according to the present invention is applied to an internal combustion engine having an intake passage for introducing air taken from outside of the engine into a cylinder; a throttle valve disposed in said intake passage, an opening of the throttle valve being adjustable for changing quantity of air passing through the intake passage; a supercharger including a compressor disposed in said intake passage at a position upstream of said throttle valve for compressing the air in said intake passage; and an intercooler disposed in said intake passage between said throttle valve and said supercharger for cooling air in the intake passage.

The air quantity estimation apparatus comprises;

an intercooler-internal air condition estimation means for estimating pressure and temperature of the air in the intercooler as pressure and temperature of throttle valve upstream air which is air at a position upstream of said throttle valve in said intake passage, respectively, by use of an intercooler model configured on the basis of an energy conversation law with respect to the air in the intercooler, the intercooler model being designed in consideration of a first energy imparted by said supercharger to air supplied (or flown) into said intercooler, and a second energy exchanged between a wall of the intercooler and the air in the intercooler; and a cylinder intake-air quantity estimation means for estimating, on the basis of the estimated pressure of the throttle valve upstream,air and the estimated temperature of the throttle valve upstream air, cylinder intake-air quantity which is quantity of air introduced into said cylinder.

According to the apparatus, the pressure and the temperature of the air in the intercooler are estimated as the pressure and the temperature of the air at the position upstream of said throttle valve in said intake passage (throttle valve upstream air), respectively, in consideration of the first energy imparted by said supercharger to the air supplied into said intercooler and the second energy exchanged between the wall of the intercooler and the air in the intercooler. Then, the cylinder intake-air quantity which is the quantity of the air introduced into said cylinder is estimated on the basis of the estimated pressure of the throttle valve upstream air and the estimated temperature of the throttle valve upstream air.

As a result, the pressure and the temperature of the throttle valve upstream air are accurately estimated, because a compression-work amount of the supercharger and a heat-transfer amount between the wall of the intercooler and the air are taken into consideration. This enables to estimate the quantity of the air introduced into said cylinder (the cylinder intake-air quantity or the cylinder-introduced air amount) with high accuracy.

In the apparatus described above, it is preferable that said intercooler-internal air condition estimation means be configured so as to estimate said first energy on the basis of a rotational speed of the compressor of said supercharger.

A very strong correlation exists between the compressor rotational speed of the supercharger which represents an operation state of the supercharger and the first energy which the supercharger imparts to the air to be supplied into the intercooler. Therefore, if the intercooler-internal air condition estimation means is configured as described above, the first energy can be accurately estimated. Accordingly, even when the operation state of the supercharger changes, it is possible to accurately estimate the pressure and the temperature of the throttle valve upstream air.

In this case, it is preferable that, said air quantity estimation apparatus comprise a compressor rotational speed-detection means for detecting said rotational speed of the compressor of the supercharger;

said intercooler-internal air condition estimation means be configured so as to estimate said first energy at a future point in time later than a present point in time on the basis of said detected rotational speed of the compressor, and to estimate, by adopting the estimated first energy at the future point in time as said first energy which is used in said intercooler model, the pressure and the temperature of the air in the intercooler at the future point in time as the pressure and the temperature of the throttle valve upstream air at the future point in time, respectively; and said cylinder intake-air quantity estimation means be configured so as to estimate the cylinder intake-air quantity at the future point in time on the basis of the estimated pressure and the estimated temperature of the throttle valve upstream air at the future point in time.

An inventor of the present invention, as a result of various studies, obtained a finding that the compressor rotational speed remains substantially unchanged within a short period of time from the present point in time to the future point in time when the cylinder intake-air quantity is to be estimated. Therefore, according to the air quantity estimation apparatus configured as described above, said first energy at the future point in time is accurately estimated. Accordingly, in the internal combustion engine comprising a supercharger, it is possible to accurately estimate the pressure and the temperature of the throttle valve upstream air at the future point in time later than the present point in time without estimating the operation state of the supercharger at the future point in time by use of a supercharger model which would generally tend to be complex. As a result, it is possible to accurately estimate the cylinder intake-air quantity at the future point in time.

DETAILED DESCRIPTION OF PREFERRED EMBODIMENT

Figure 1:
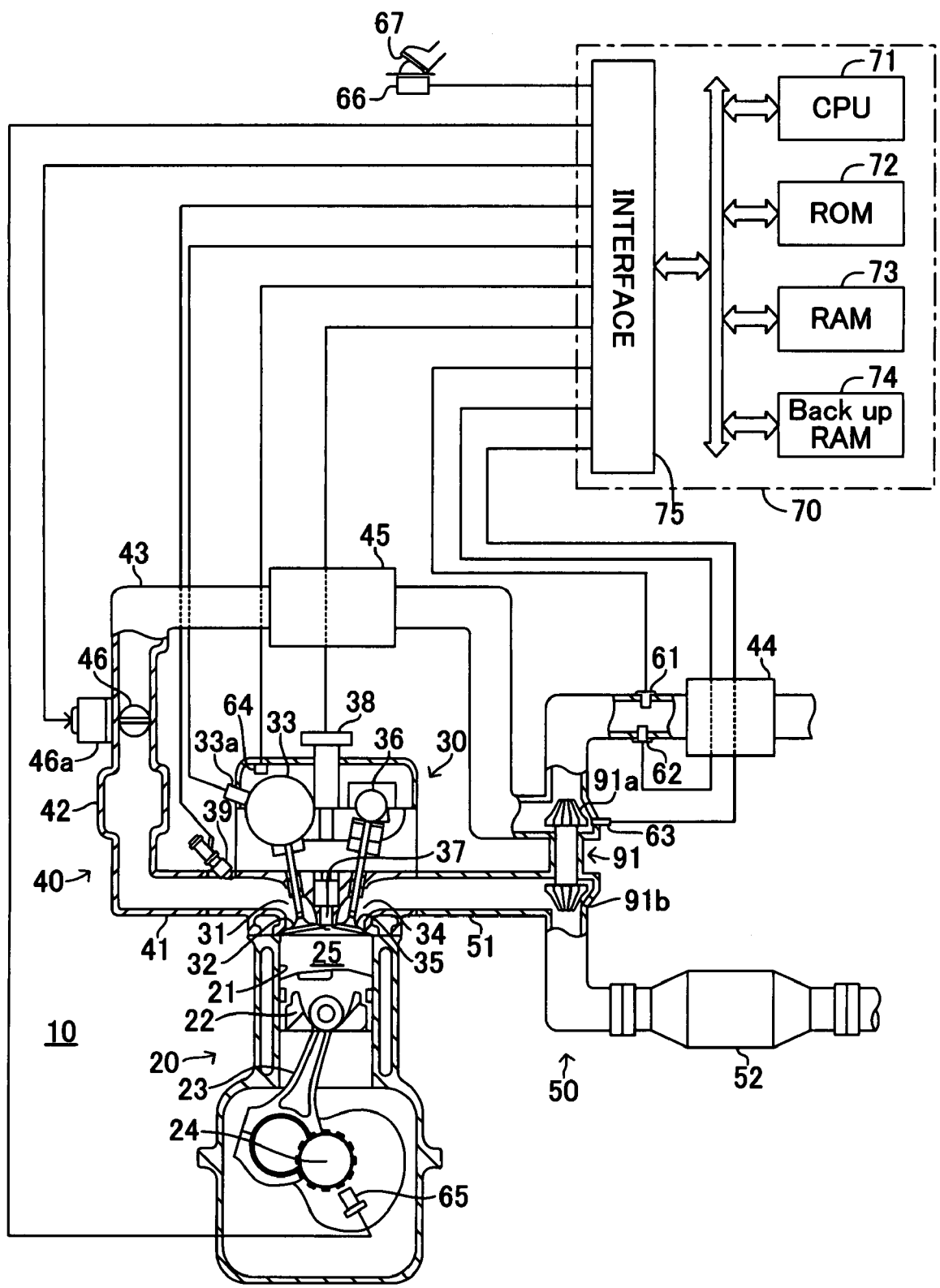
FIG. 1 is a schematic view of a system in which an air quantity estimation apparatus according to an embodiment of the present invention is applied to a spark-ignition multi-cylinder-internal combustion engine.

An air quantity estimation apparatus for an internal combustion engine according to each embodiment of the present invention will be described below with reference to the drawings. FIG. 1 shows a schematic view of a system in which the air quantity estimation apparatus according to the embodiment of the present invention is applied to a spark-ignition multi-cylinder (e.g., 4-cylinder) internal combustion engine 10. It should be noted that FIG. 1 shows only a sectional view of a specific cylinder, however, the remaining cylinders have the same configuration.

The internal combustion engine 10 includes a cylinder block section 20 including a cylinder block, a cylinder block lower-case, an oil pan, etc.; a cylinder head section 30 fixed onto the cylinder block section 20; an intake system 40 for supplying gas mixture of fuel and air to the cylinder block section 20; and an exhaust system 50 for emitting exhaust gas from the cylinder block section 20 to the exterior of the engine 10.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and the head of the piston 22, together with the cylinder head section 30, form a combustion chamber 25.

The cylinder head section 30 includes an intake port 31 communicating with the combustion chamber 25; an intake valve 32 for opening and closing the intake port 31; a variable intake timing unit 33 including an intake cam shaft to drive the intake valve 32 for continuously change the phase angle of the intake cam shaft; an actuator 33a of the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector 39 for injecting fuel into the intake port 31.

The intake system 40 includes an intake manifold 41 communicating with the intake ports 31; a surge tank 42 communicating with the intake manifold 41; an intake duct 43 having one end connected to the surge tank 42 and forming an intake passage together with the intake manifold 41 and the surge tank 42; and an air filter 44, a compressor 91a of a supercharger 91, an intercooler 45, a throttle valve 46, and a throttle valve actuator 46a. The air filter 44, the compressor 91a, the intercooler 45, the throttle valve 46 are disposed in the intake duct 43 in this order from the other end of the intake duct 43 toward the downstream side (the surge tank 42). It should be noted that the intake passage from the throttle valve 46 to the intake valve 32 constitutes an intake pipe section.

The intercooler 45 is an air cooling type intercooler, and is configured to cool air flowing through the intake passage by means of air outside the internal combustion engine 10. The intercooler 45 constitutes an intercooler section together with the intake passage from the outlet (downstream) of the compressor 91a to the throttle valve 46.

The throttle valve 46 is rotatably supported by the intake duct 43 and is driven by the throttle valve actuator 46a for adjusting its opening. According to this configuration, the throttle valve 46 can change the cross sectional area of a passage formed by the intake duct 43.

The throttle valve actuator 46a comprising a DC motor drives the throttle valve 46 such that an actual throttle valve opening θta becomes equal to a target throttle valve opening θtt, in accordance with a drive signal sent from an electronic-control throttle valve logic which an electric control unit 70 performs, as described later.

The exhaust system 50 includes an exhaust pipe 51 including an exhaust manifold communicating with the exhaust ports 34 and forming an exhaust passage together with the exhaust ports 34; a turbine 91b of the supercharger 91 disposed within the exhaust pipe 51; and a 3-way catalytic unit 52 disposed in the exhaust pipe 51 at a position downstream of the turbine 91b.

According to the configuration described above, the turbine 91b of the supercharger 91 is rotated by energy of exhaust gas. Further, the turbine 91b is connected to the compressor 91a disposed in the intake system 40 via a shaft. Thus, the compressor 91a in the intake system 40 rotates together with the turbine 91b to compress the air in the intake passage. That is, the supercharger 91 supercharges air into the internal combustion engine 10.

Meanwhile, this system includes a pressure sensor 61; a temperature sensor 62; a compressor rotational speed sensor 63 serving as a compressor rotational speed-detection means; a cam position sensor 64; a crank position sensor 65; an accelerator opening sensor 66 serving as an operation state quantity obtaining means; and the electric control unit 70.

The pressure sensor 61 is disposed in the intake duct 43 at a position between the air filter 44 and the compressor 91a. The pressure sensor 61 detects a pressure of air in the intake duct 43, and outputs a signal representing intake-air pressure Pa, which is a pressure of the air in the intake passage at the position upstream of the compressor 91a. The temperature sensor 62 is disposed in the intake duct 43 at a position between the air filter 44 and the compressor 91a. The temperature sensor 62 detects a temperature of the air in the intake duct 43, and outputs a signal representing intake-air temperature Ta, which is a temperature of the air in the intake passage at the position upstream of the compressor 91a. The compressor rotational speed sensor 63 outputs a signal every time the rotational shaft of the compressor 91a rotates by 360 degrees. This signal represents compressor rotational speed Ncm. The cam position sensor 64 generates a signal (G2 signal) having a single pulse every time the intake cam shaft rotates by 90 degrees (i.e., every time the crankshaft 24 rotates by 180 degrees). The crank position sensor 65 outputs a signal having a narrow pulse every time the crankshaft 24 rotates by 10 degrees and having a wide pulse every time the crankshaft 24 rotates by 360 degrees. This signal represents engine rotational speed NE. The accelerator opening sensor 66 detects an operation amount of an accelerator pedal 67 operated by a driver, and outputs a signal representing the operation amount of the accelerator pedal Accp.

The electric control unit 70 is a microcomputer including a CPU 71; a ROM 72 that stores in advance programs executed by the CPU 71, tables (lookup tables and maps), constants, and others; a RAM 73 in which the CPU 71 stores data temporarily if necessary; backup RAM 74 which stores data while power is turned on and which retains the stored data even while power is turned off; and an interface 75 including AD converters, all of which are mutually connected via a bus. The interface 75 is connected to the above-mentioned sensors 61 to 66 and supplies signals from the sensors 61 to 66 to the CPU 71. The interface 75 sends drive signals (instruction signals) to the actuator 33a of the variable intake timing unit 33, the igniters 38, the injectors 39, and the throttle valve actuator 46a according to instructions of the CPU 71.

Next will be described an outline of a method for estimating cylinder intake-air quantity performed by the air quantity estimation apparatus for the internal combustion engine configured as described above.

In the internal combustion engine 10 to which the present air quantity estimation apparatus is applied, fuel must be injected before an intake valve-closing timing (i.e., by a timing at which an intake stroke ends), because the injector 39 is disposed at a position upstream of the intake valve 32. Accordingly, in order to determine a fuel injection amount required to form an air-fuel mixture within a cylinder of which air-fuel ratio coincides with a target air-fuel ratio, the air quantity estimation apparatus must estimate, at a predetermined (or certain) point in time before fuel injection, "the cylinder intake-air quantity at the intake valve-closing timing".

In view of the above, the air quantity estimation apparatus estimates pressure and temperature of air in the intercooler 45 at a future point in time later than (or after) a present point in time as pressure and temperature of throttle valve upstream air at the future point in time, by use of physical models constructed on the basis of physical laws such as the energy conservation law, the momentum conservation law, and the mass conservation law. The air quantity estimation apparatus estimates cylinder intake-air quantity at the future point in time on the basis of the estimated pressure and the estimated temperature of the throttle valve upstream air at the future point in time (i.e., the pressure and the temperature of the air in the intercooler 45).

The air quantity estimation apparatus adopts (employs) a physical model designed (constructed or configured) in consideration of a first energy imparted by the compressor 91a of the supercharger 91 to the air supplied into the intercooler 45 and a second energy exchanged between a wall of the intercooler 45 and the air in the intercooler 45, as one of the physical models for estimating the pressure and the temperature of the air in the intercooler 45 at the future point in time.

Figure 2:
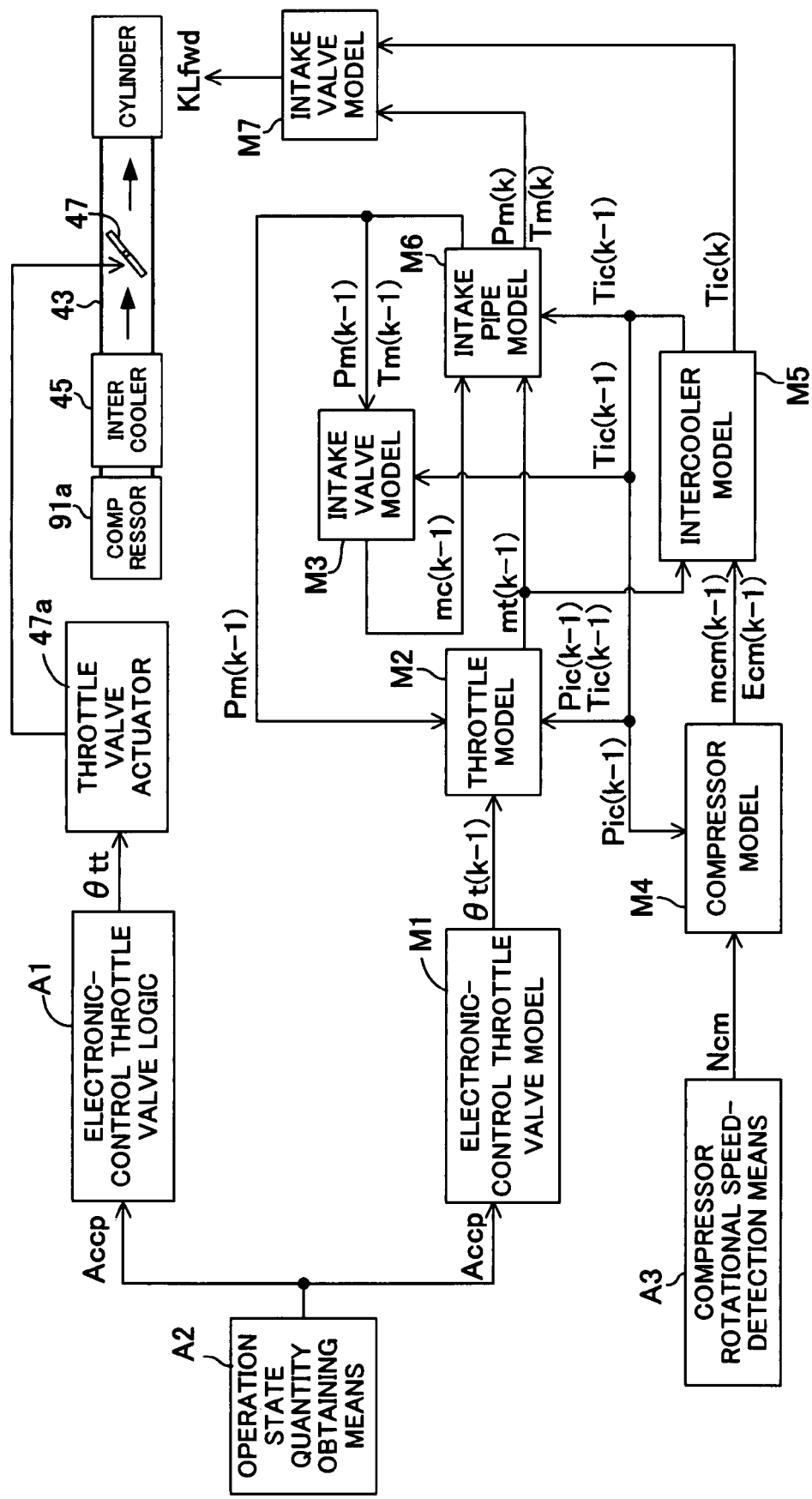
FIG. 2 is a functional block diagram of a logic circuitry and various models for controlling a throttle valve opening and estimating a cylinder intake-air quantity.

As shown in a function block diagram of FIG. 2, the air quantity estimation apparatus includes an electronic-control throttle valve model M1. The air quantity estimation apparatus includes a throttle model M2, an intake valve model M3, a compressor model M4, an intercooler model M5, an intake pipe model M6, and an intake valve model M7, as the above-mentioned physical models constructed on the basis of the physical laws. Further, the air quantity estimation apparatus includes an electronic-control throttle valve logic A1. It should be noted that the compressor model M4 and the intercooler model M5 constitute main portions of the intercooler-internal air condition estimation means. It should also be noted that the throttle model M2, the intake valve model M3, the intake pipe model M6, and the intake valve model M7 constitute main portions of the cylinder intake-air quantity estimation means.

The models M2 to M7 (the throttle model M2, the intake valve model M3, the compressor model M4, the intercooler model M5, the intake pipe model M6, and the intake valve model M7) are represented by mathematical formulas (hereinafter also referred to as "generalized mathematical formulas") which are formulated (or derived) based on the above-mentioned physical laws so as to represent behavior of air at a certain point in time.

Here, if a value to be obtained is a value at a "certain point in time", all values (variables) used in the generalized mathematical formulas must be values at the certain point in time. That is, for example, when a certain model is represented by a generalized mathematical formula y=f(x), the variable x must be a value at a specific future point in time later than the present time in order to obtain the value of y at the specific future point in time.

Incidentally, as described above, the cylinder intake-air quantity to be obtained by the air quantity estimation apparatus is one at a future point in time later than the present point in time (the present point in time being a calculation point in time). Accordingly, as described below, a throttle valve opening $\theta t$, the compressor rotational speed Ncm, the intake-air pressure Pa, the intake-air temperature Ta, the engine rotational speed NE, and the open-close timing VT of the intake valve 32, etc., which are used in the models M2 to M7, must be values at the future point in time later than the present point in time.

Therefore, the air quantity estimation apparatus delays a target throttle valve opening from the point in time at which the apparatus determines the target throttle valve opening to control the throttle valve 46, thereby estimating the throttle valve openings at future points in time later than the present point in time (at timings from the present point in time to a first point in time which is later than the present point in time (the first point in time being, in the present example, a point in time after elapse of a delay time TD from the present point in time)).

Further, as described above, the compressor rotational speed Ncm does not greatly change within the short period of time from the present point in time to the future point in time at which the cylinder intake-air quantity is to be estimated. Therefore, the air quantity estimation apparatus uses (or adopts), as the compressor rotational speed Ncm at the future point in time, the compressor rotational speed Ncm at the present point in time which is detected by the compressor rotational speed sensor 63.

Also, the intake-air pressure Pa, the intake-air temperature Ta, the engine rotational speed NE, and the open-close timing VT of the intake valve 32 do not greatly change within the above-mentioned short period of time. Therefore, the air quantity estimation apparatus uses (or adopts), for the above-mentioned generalized mathematical formulas, the intake-air pressure Pa, the intake-air temperature Ta, the engine rotational speed NE, and the open-close timing VT of the intake valve 32, all of which are values at the present point in time as those at the future point in time, respectively.

As is described above, the present air quantity estimation apparatus estimates the cylinder intake-air quantity at the future point in time later than the present point in time on the basis of the estimated throttle valve opening $\theta t$ at the future point in time later than the present point in time; the detected compressor rotational speed Ncm at the present point in time; the intake-air pressure Pa at the present point in time; the intake-air temperature Ta at the present point in time; the engine rotational speed NE at the present point in time; the open-close timing VT of the intake valve 32 at the present point in time; and the models M2 to M7.

Next, the models M1 to M7 and logic Al will be described specifically. It should be noted that, since ways of how to derive formulas (equations) representing the throttle model M2, the intake valve model M3, the intake pipe model M6, and the intake valve model M7 are well known (see Japanese Patent Application Laid-Open (kokai) No. 2001-41095 and 2003-184613), their detailed descriptions are omitted in the present specification.

[Electronic-Control Throttle Valve Model M1 and Electronic-Control Throttle Valve Logic A1]

The electronic-control throttle valve model M1 cooperates with the electronic-control throttle valve logic A1 so as to estimate the throttle valve opening $\theta t$ at each of the points in time up to the above-mentioned first point in time on the basis of some of the accelerator pedal operation amounts Accp at points in time up to the present point in time.

Figure 3:
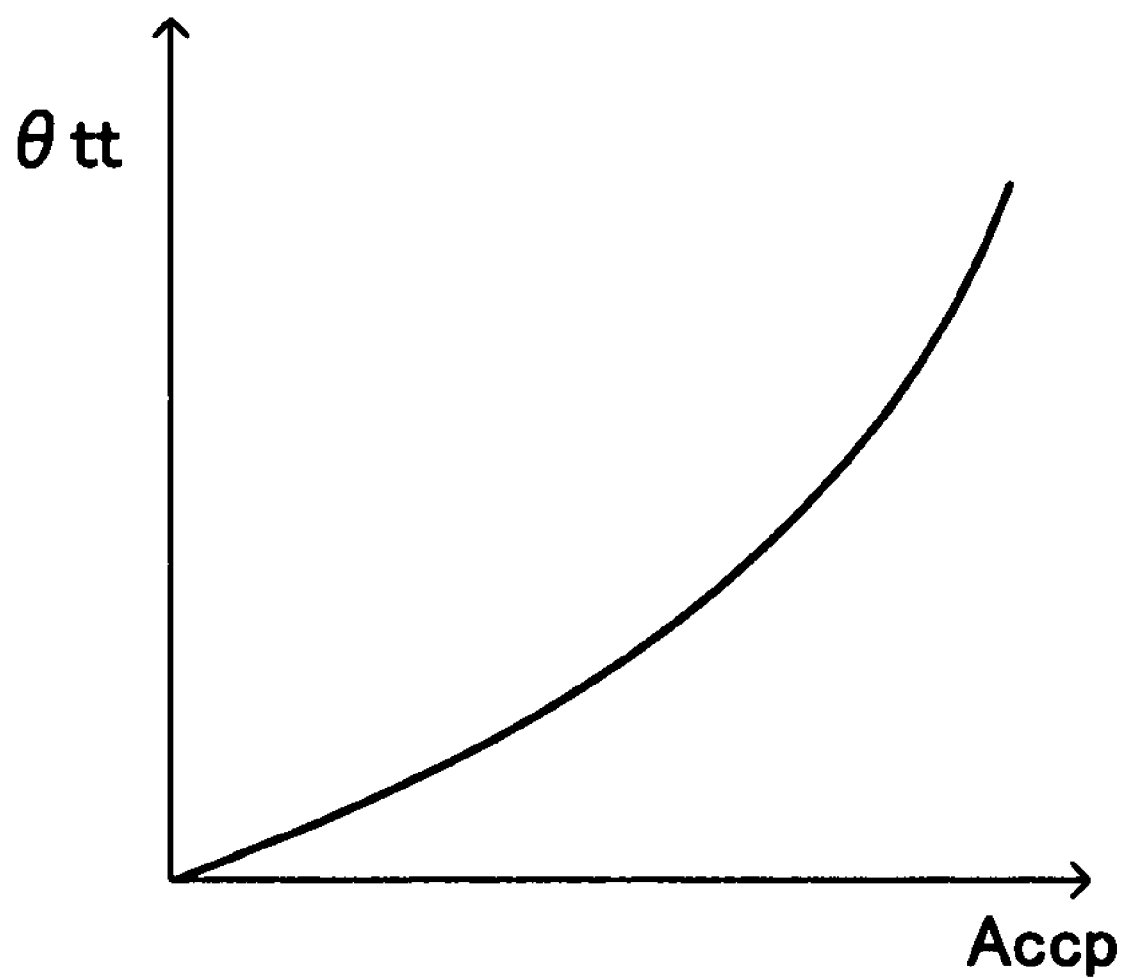
FIG. 3 is a table specifying a relation between an accelerator pedal operation amount and a target throttle valve opening, the table being referenced by a CPU shown in FIG. 1.
Figure 4:
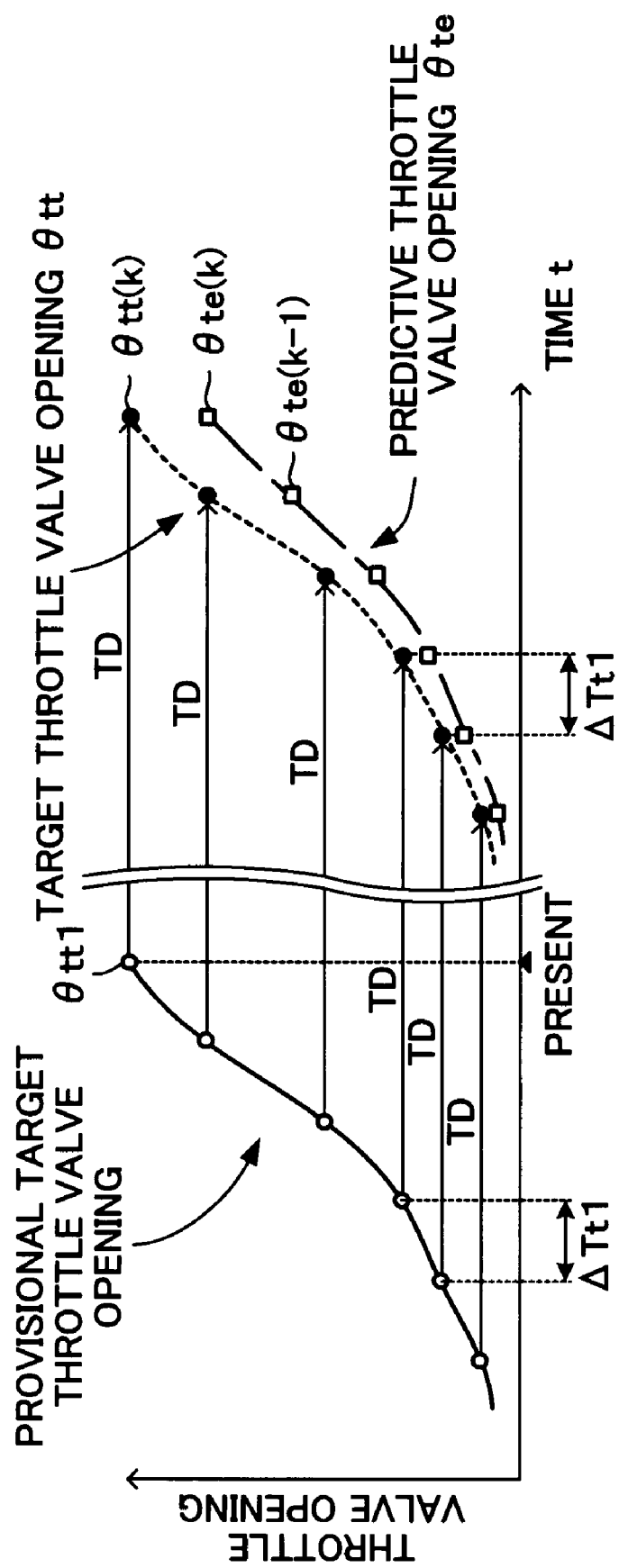
FIG. 4 is a time chart showing changes in a provisional target throttle valve opening, a target throttle valve opening, and a predicted throttle valve opening.

More specifically, the electronic-control throttle valve logic A1 determines, every time a predetermined time $\Delta Tt1$ (in the present example, 2 ms) elapses, a provisional target throttle valve opening $\theta tt1$, on the basis of the actual accelerator pedal operation amount Accp detected by the accelerator opening sensor 66 and a table defining a relationship between a accelerator pedal operation amount Accp and a target throttle valve opening $\theta tt$, as shown in FIG. 3. Further, as shown in a time chart in FIG. 4, the electronic-control throttle valve logic A1 sets (or stores) the provisional target throttle valve opening $\theta tt1$ to (or as) a target throttle valve opening $\theta tt$ at a point in time (first point in time) after elapse of a predetermined delay time TD (in the present example, 64 ms). That is, the electronic-control throttle valve logic A1 sets the provisional target throttle valve opening $\theta tt1$ determined at a point in time which is before the present point in time by the predetermined delay time TD to the target throttle valve opening $\theta tt$ at the present point in time. The electronic-control throttle valve logic A1 outputs a drive signal to the throttle valve actuator 46a so as to make the throttle valve opening $\theta ta$ at the present point in time become equal to the target throttle valve opening $\theta tt$ at the present point in time.

Incidentally, when the drive signal is sent from the electronic-control throttle valve logic A1 to the throttle valve actuator 46a, the actual throttle valve opening $\theta ta$ follows the target throttle valve opening $\theta tt$ with some delay, due to delay in operation of the throttle valve actuator 46a and inertia of the throttle valve 46 or the like. In view of this, the electronic-control throttle valve model M1 estimates (predicts) the throttle valve opening at the point in time after elapse of the delay time TD on the basis of the following Equation (1) (see FIG. 4).

$$\theta te(k) = \theta te(k-1) + \Delta Tt1 \cdot f(\theta tt(k), \theta te(k-1)) \quad (1)$$

pipe section; Tic is an intercooler-internal temperature which is a temperature of the air within the intercooler 45 (that is a throttle valve upstream temperature which is a temperature of the air in the intake passage at the position upstream of the throttle valve 46); R is a gas constant; and κ is a ratio of specific heat of air (hereinafter, κ is handled as a constant value).

$$mt = Ct(\theta t) \cdot At(\theta t) \cdot \frac{Pic}{\sqrt{R \cdot Tic}} \cdot \Phi(Pm/Pic) \quad (2)$$

$$\Phi(Pm/Pic) = \quad (3)$$

$$\begin{cases} \sqrt{\dfrac{\kappa}{2 \cdot (\kappa+1)}} & \text{for the case where } \dfrac{Pm}{Pic} \leq \dfrac{1}{\kappa+1} \\ \sqrt{\left\{\dfrac{\kappa-1}{2\kappa}\left(1-\dfrac{Pm}{Pic}\right)+\dfrac{Pm}{Pic}\right\}\left(1-\dfrac{Pm}{Pic}\right)} & \text{for the case where } \dfrac{Pm}{Pic} > \dfrac{1}{\kappa+1} \end{cases}$$

Figure 5:
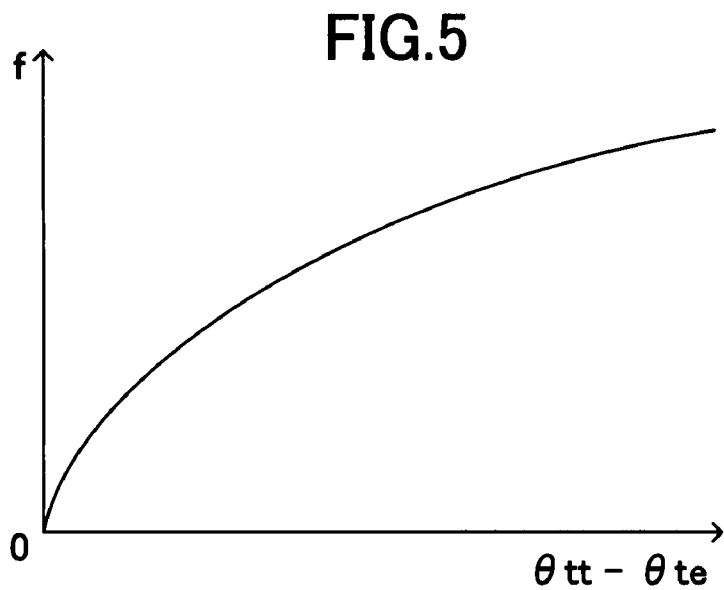
FIG. 5 is a graph showing a function used to calculate the predicted throttle valve opening.

In the Equation (1), θte(k) is a predicted throttle valve opening θte which is newly estimated at a present (current) calculation point in time, θtt(k) is a target throttle valve opening θtt which is newly set at the present calculation point in time, and θte(k−1) is a predicted throttle valve opening θte which has already been estimated by the present calculation point in time (that is, a predicted throttle valve opening θte which was newly estimated at a previous calculation point in time). As shown in FIG. 5, the function f (θtt, θte) is a certain function for providing a value which increases as a difference Δθ between the θtt and the θte (Δθ=θtt−θte) increases; i.e., the monotonically increasing function f with respect to Δθ.

As described above, at the present calculation point in time, the electronic-control throttle valve model M1 newly determines the target throttle valve opening θtt at the first point in time (point in time after elapse of the delay time TD from the present point in time); newly estimates the throttle valve opening θte at the first point in time; and memorizes (stores) sets of the target throttle valve opening θtt and the predicted throttle valve opening θte up to the first point in time in the RAM 73 while relating each of the set to the elapse of time from the present point in time. It should be noted that, if the actual throttle valve opening θta coincides with the target throttle valve opening θtt with a negligible delay after the drive signal is sent to the throttle valve actuator 46a, the throttle valve opening may be estimated by an equation (θte (k)=θtt(k)) in place of the Equation (1).

[Throttle Model M2]

The throttle model M2 estimates a flow rate mt of air passing around the throttle valve 46 (throttle-passing air flow rate) in accordance with Equations (2) and (3), which are generalized mathematical formulas representing the throttle model M2 and are obtained on the basis of physical laws, such as the energy conservation law, the momentum conservation law, the mass conservation law, and the state (gas) equation. In the Equation (2), Ct(θt) is a flow rate coefficient which varies according to the throttle valve opening θt; At(θt) is a throttle opening (cross-sectional) area (cross-sectional opening area around the throttle valve 46 in the intake passage) which varies according to the throttle valve opening θt; Pic is an intercooler-internal pressure which is a pressure of the air in the intercooler 45 (that is a throttle valve upstream pressure which is a pressure of the air in the intake passage at a position upstream of the throttle valve 46); Pm is an intake pipe-internal pressure which is a pressure of the air in the intake Here, the product Ct(θt)·At(θt) of the Ct(θt) and the At(θt) on the right-hand side of the Equation (2) can be empirically determined on the basis of the throttle valve opening θt. In view of this, the throttle model M2 stores in the ROM 72 a table MAPCTAT which defines a relationship between the throttle valve opening θt and the Ct(θt)·At(θt), and obtains the Ct(θt)·At(θt)(=MAPCTAT (θt(k−1))) on the basis of the predicted throttle valve opening θt(k−1)(=θte) estimated by the electronic-control throttle valve M3 obtains the cylinder flow-in air flow rate mc in accordance with the following Equation (5), which is a generalized mathematical formula representing the intake valve model M3 and is based on an empirical rule.

$$mc = (Tic/Tm) \cdot (c \cdot Pm - d) \quad (5)$$

In the Equation (5), the value c is a proportion coefficient, and the value d is a value reflecting quantity of burned gas (exhausted gas) remaining within the cylinder. The value of the coefficient c can be obtained based on the engine rotational speed NE at the present point in time, the open-close timing VT of the intake valve 32 at the present point in time, and a table MAPC which defines a relationship between the engine rotational speed NE, the open-close timing VT of the intake valve 32, and the value of the coefficient c (c=MAPC (NE, VT)). The intake valve model M3 stores the table MAPC in the ROM 72. Similarly, the value d can be obtained based on the engine rotational speed NE at the present point in time, the open-close timing VT of the intake valve 32 at the present point in time, and a table MAPD which defines a relationship between the engine rotational speed NE, the open-close timing VT of the intake valve 32, and the value of the constant d (d=MAPD(NE, VT)). The intake valve model M3 stores the table MAPD in the ROM 72.

The intake valve model M3 estimates a cylinder flow-in air flow rate mc(k−1) by applying to the Equation (5) the preceding (latest) intake pipe-internal pressure Pm(k−1) and the intake pipe-internal temperature Tm(k−1) both of which have been already estimated by the intake pipe model M6 described later, and the preceding (latest) intercooler-internal temperature Tic(k−1) which has been already estimated by the intercooler model M5 described later.

[Compressor Model M4]model M1.

Further, the throttle model M2 stores in the ROM 72 a table MAPΦwhich defines a relationship between a value of Pm/Pic and a value of Φ(Pm/Pic), and obtains a value of Φ(Pm(k−1)/Pic(k−1))(=MAPΦ(Pm(k−1)/Pic(k−1))) by using the table MAPΦ and the value of Pm(k−1)/Pic(k−1) obtained by dividing a value of the preceding (latest) intake pipe-internal pressure Pm(k−1) that has been already estimated by the intake pipe model M6 described later, by a value of the preceding (latest) intercooler-internal pressure (throttle valve upstream pressure) Pic(k−1) that has been already estimated by the intercooler model M5 described later. The throttle model M2 obtains a throttle-passing air flow rate mt(k−1) by applying to the Equation (2) the value of Φ(Pm(k−1)/Pic(k−1)) thus obtained, the preceding (latest) intercooler-internal pressure Pic(k−1) and the intercooler-internal temperature Tic(k−1), both of which have been already estimated by the intercooler model M5 described later.

[Intake Valve Model M3]

The intake valve model M3 estimates a cylinder flow-in air flow rate mc, which is a flow rate of air flowing into the cylinder after passing around the intake valve 32, based on the intake pipe-internal pressure Pm which is the pressure of air in the intake pipe section, and the intake pipe temperature Tm which is the temperature of air in the intake pipe section, and the intercooler-internal temperature Tic etc. A pressure in the cylinder (within the cylinder 21, or within the combustion chamber 25) during the intake stroke (including a point in time at which the intake valve 32 closes) can be regarded as (or equal to) a pressure at a position of an upstream side of the intake valve 32, i.e., the intake pipe-internal pressure Pm. Therefore, the cylinder flow-in air flow rate mc can be considered to be proportional to the intake pipe-internal pressure Pm at the point in time at which the intake valve 32 closes. In view of this, the intake valve model The compressor model M4 estimates, a flow rate (or compressor flow-out air flow rate) of air flowing out of the compressor 91a (that is, air supplied into the intercooler 45) mcm, and a compressor-imparting energy Ecm (first energy) which is an energy which the compressor 91a of the supercharger 91 imparts to the air to be supplied to the intercooler 45 per unit time while the air passes through the compressor 91a, on the basis of the intercooler-internal pressure Pic, the compressor rotational speed Ncm, and so forth.

First, the compressor flow-out air flow rate mcm estimated by the compressor model M4 will be described. The compressor flow-out air flow rate mcm can be empirically estimated on the basis of a value Pic/Pa obtained by dividing the intercooler-internal pressure Pic by the intake-air pressure Pa, and the compressor rotational speed Ncm. Accordingly, the compressor flow-out air flow rate mcm is obtained from the compressor rotational speed Ncm, the value Pic/Pa obtained by dividing the intercooler-internal pressure Pic by the intake-air pressure Pa, and a table MAPMCM which defines a relationship between the compressor rotational speed Ncm and the value Pic/Pa.

Figure 6:
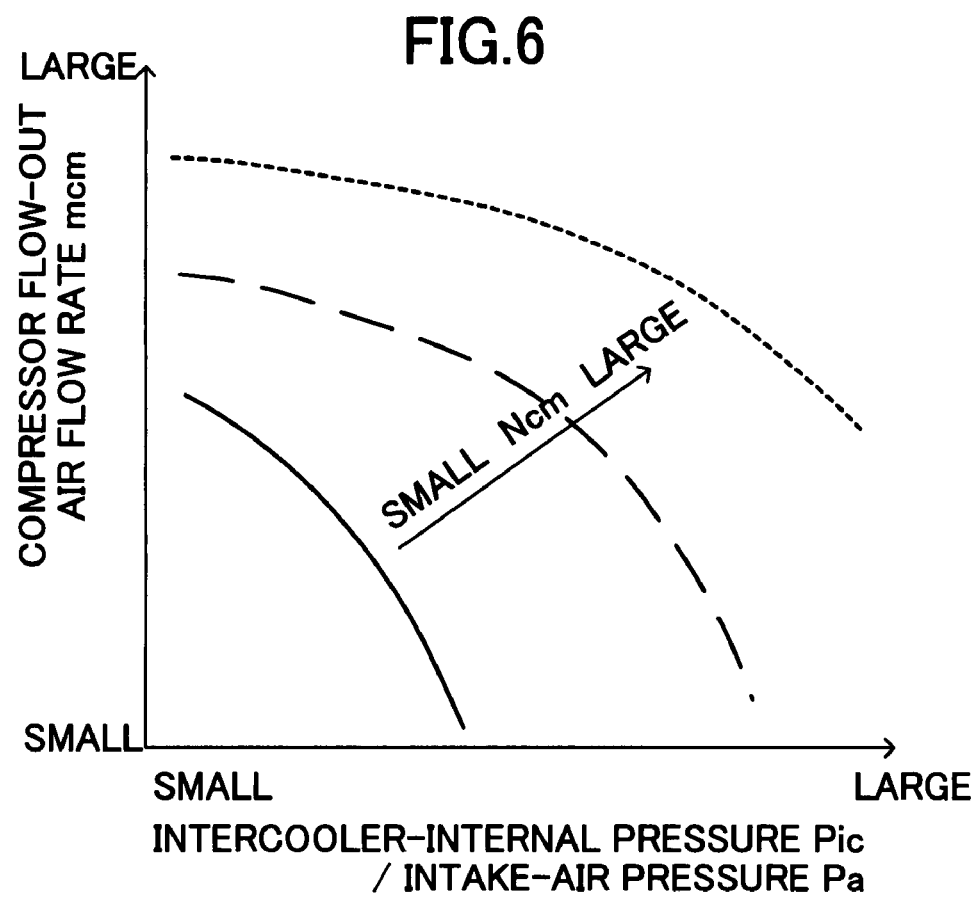
FIG. 6 is a table specifying a relation among a value obtained by dividing an intercooler-internal pressure by an intake-air pressure, a compressor rotational speed, a compressor flow-out air flow rate, the table being referenced by the CPU shown in FIG. 1.

The compressor model M4 stores in the ROM 72 the table MAPMCM as shown in FIG. 6. The compressor model M4 estimates a compressor flow-out air flow rate mcm(k−1) (=MAPMCM(Pic(k−1)/Pa, Ncm)) based on the table MAPMCM, the compressor rotational speed Ncm at the present point in time detected by the compressor rotational speed sensor 63, and a value Pic(k−1)/Pa which is obtained by diving a preceding (latest) intercooler-internal pressure Pic(k−1) that has been already estimated by the intercooler model M5 described later by the intake-air pressure Pa at the present point in time.

It should be noted that, in place of the table MAPMCM, compressor model M4 may store in the ROM 72 a table MAPMCMSTD which defines a relationship between a value Picstd/Pstd obtained by dividing an intercooler-internal pressure Picstd in a standard state by a standard pressure Pstd, a compressor rotational speed Ncmstd in the standard state, and a compressor flow-out air flow rate mcmstd in the standard state. Here, the standard state is a state where a pressure of compressor flow-in air, which is air flowing into the compressor 91a, is the standard pressure Pstd (e.g., 96,276 Pa), and a temperature of the compressor flow-in air is standard temperature Tstd (e.g., 303.02 K).

In this case, specifically, the compressor model M4 obtains the compressor flow-out air flow rate mcmstd in the standard state based on, the value Pic/Pa obtained by dividing the intercooler-internal pressure Pic by the intake-air pressure Pa, the compressor rotational speed Ncmstd in the standard state obtained by applying the compressor rotational speed Ncm at the present point in time detected by the compressor rotational speed sensor 63 to the right-hand side of Equation (6) described below, and the table MAPMCMSTD.

Subsequently, the compressor model M4 applies the obtained compressor flow-out air flow rate mcmstd in the standard state to the right-hand side of Equation (7) described below so as to obtain the compressor flow-out air flow rate mcm in a state in which the pressure of the compressor flow-in air is equal to the intake-air pressure Pa and the temperature of the compressor flow-in air is equal to the intake-air temperature Ta.

$$Ncmstd = Ncm \cdot \frac{1}{\sqrt{\frac{Ta}{Tstd}}} \tag{6}$$

$$mcm = mcmstd \cdot \frac{\frac{Pa}{Pstd}}{\sqrt{\frac{Ta}{Tstd}}} \tag{7}$$

Next, the compressor-imparting energy Ecm estimated by the compressor model M4 will be described. The compressor-imparting energy Ecm is obtained by use of Equation (8) described below, which is a generalized mathematical formula representing a portion of the compressor model M4 and is based on the energy conservation law, a compressor efficiency η, the compressor flow-out air flow rate mcm, the value Pic/Pa obtained by dividing the intercooler-internal pressure Pic by the intake-air pressure Pa, and the intake-air temperature Ta.

$$Ecm = Cp \cdot mcm \cdot Ta\left(\left(\frac{Pic}{Pa}\right)^{\frac{\kappa-1}{\kappa}} - 1\right)\frac{1}{\eta} \tag{8}$$

In the Equation (8), Cp is specific heat at constant pressure of air. The compressor efficiency η can be empirically estimated on the basis of the compressor flow-out air flow rate mcm and the compressor rotational speed Ncm. Accordingly, the compressor efficiency η is obtained based on the compressor flow-out air flow rate mcm, the compressor rotational speed Ncm, and a table MAPETA which defines a relationship among the compressor flow-out air flow rate mcm, the compressor rotational speed Ncm, and the compressor efficiency η.

Figure 7:
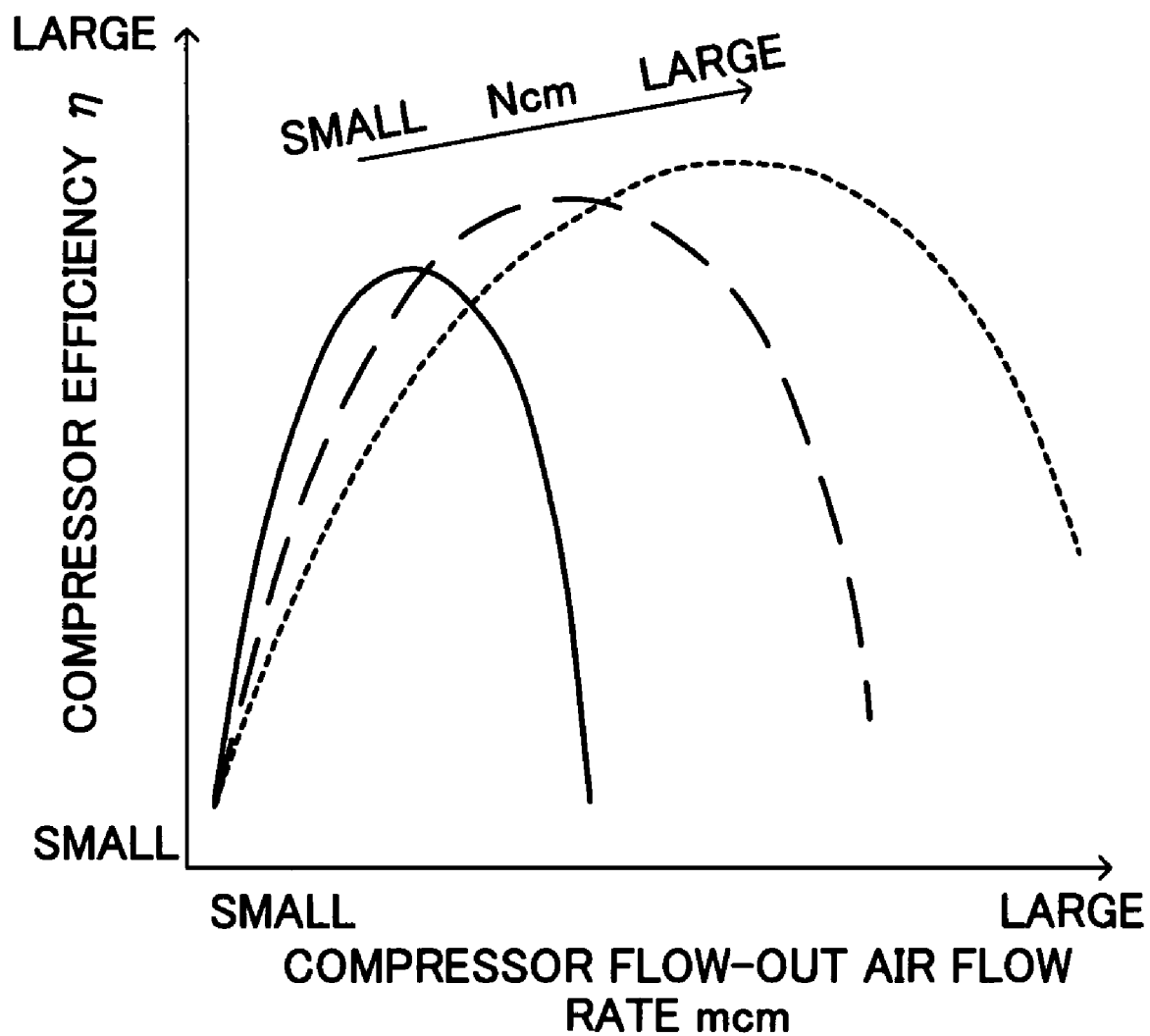
FIG. 7 is a table specifying a relation among the compressor flow-out air flow rate, the compressor rotational speed, and a compressor efficiency, the table being referenced by the CPU shown in FIG. 1.

The compressor model M4 stores in the ROM 72 the table MAPETA as shown in FIG. 7. The compressor model M4 estimates a compressor efficiency η(k−1)(=MAPETA(mcm(k−1), Ncm)) from the table MAPETA, the estimated compressor flow-out air flow rate mcm(k−1) described above, and the compressor rotational speed Ncm at the present point in time detected by the compressor rotational speed sensor 63.

Subsequently, the compressor model M4 estimates the compressor-imparting energy Ecm(k−1) by applying to the Equation (8) the estimated compressor efficiency η(k−1), the estimated compressor flow-out air flow rate mcm(k−1), the value Pic(k−1)/Pa obtained by dividing the preceding (latest) intercooler-internal pressure Pic(k−1) that has been already estimated by the intercooler model M5 described later by the intake-air pressure Pa at the present point in time, and the intake-air temperature Ta at the present point in time. It should be noted that, as shown in FIGS. 6 and 7, a very strong correlation exits between the compressor flow-out air flow rate mcm, the compressor efficiency η, and the compressor rotational speed Ncm. Accordingly, the compressor-imparting energy Ecm which is estimated based on the compressor flow-out air flow rate mcm and the compressor efficiency η, has a very strong correlation with the compressor rotational speed Ncm.

Here, there will be described a procedure of deriving the Equation (8), which represents a portion of the compressor model M4. In the following description, it is assumed that all energy of air from flowing into the compressor 91a and until flowing out of the compressor 91a contributes to temperature increase (i.e., kinetic energy is ignored).

Here, the flow rate of compressor flow-in air, which is air flowing into the compressor 91a, is represented by mi, the temperature of the compressor flow-in air is represented by Ti. Similarly, the flow rate of compressor flow-out air, which is air flowing out of the compressor 91a, is represented by mo, and the temperature of the compressor flow-out air is represented by To. In this case, the energy of the compressor flow-in air is represented by Cp·mi·Ti, and the energy of the compressor flow-out air is represented by Cp·mo·To. Since the sum of the energy of the compressor flow-in air and the compressor-imparting energy Ecm is equal to the energy of the compressor flow-out air, the following Equation (9) based on the energy conservation law is obtained.

$$Cp·mi·Ti+Ecm=Cp·mo·To \quad (9)$$

Incidentally, since the flow rate mi of the compressor flow-in air is equal to the flow rate mo of the compressor flow-out air, the following Equation (10) can be obtained.

$$Ecm=Cp·mo·(To-Ti) \quad (10)$$

Meanwhile, the compressor efficiency η is defined by the following Equation (11).

$$\eta = \frac{Ti\left(\left(\frac{Po}{Pi}\right)^{\frac{\kappa-1}{\kappa}} - 1\right)}{To - Ti} \quad (11)$$

In the Equation (11), Pi is a pressure of the compressor flow-in air, and Po is a pressure of the compressor flow-out air.

The following Equation (12) is obtained by substituting the above-mentioned Equation (11) into the Equation (10).

$$Ecm = Cp·mo·Ti\left(\left(\frac{Po}{Pi}\right)^{\frac{\kappa-1}{\kappa}} - 1\right)\frac{1}{\eta} \quad (12)$$

Incidentally, the pressure Pi and the temperature Ti of the compressor flow-in air can be considered to be equal to the intake-air pressure Pa and the intake-air temperature Ta, respectively. In addition, since pressure propagates more quickly than temperature, the pressure Po of the compressor flow-out air can be considered to be equal to the intercooler-internal pressure Pic. Further, the flow rate mo of the compressor flow-out air is the compressor flow-out air flow rate mcm. When these are considered, the Equation (8) is obtained from the Equation (12).

[Intercooler Model M5]

The intercooler model M5 obtains the intercooler-internal pressure Pic and the intercooler-internal temperature Tic in accordance with the following Equations (13) and (14), which are generalized mathematical formulas representing the intercooler model M5 and are based on the mass conservation law and the energy conservation law, respectively, and on the basis of the intake-air temperature Ta, the flow rate of air flowing into the intercooler section (i.e., compressor flow-out air flow rate) mcm, the compressor-imparting energy Ecm, and the flow rate of the air flowing out of the intercooler section (i.e., the throttle-passing air flow rate) mt. It should be noted that, in the Equations (13) and (14) below, Vic represents a volume of the intercooler section.

$$d(Pic/Tic)/dt=(R/Vic)·(mcm-mt) \quad (13)$$

$$dPic/dt=\kappa·(R/Vic)·(mcm·Ta-mt·Tic)+(\kappa-1)/(Vic)·(Ecm-K·(Tic-Ta)) \quad (14)$$

The intercooler model M5 applies to the right-hand sides of the Equations (13) and (14) the compressor flow-out air flow rate mcm(k−1) and the compressor-imparting energy Ecm(k−1) both of which are obtained by the compressor model M4, the throttle-passing air flow rate mt(k−1) obtained by the throttle model M2, and the intake-air temperature Ta at the present point in time. Subsequently, the intercooler model M5 performs calculations based on the Equations (13) and (14) to estimate latest intercooler-internal pressure Pic(k) and latest intercooler-internal temperature Tic(k).

Here, there will be described a procedure of deriving the Equations (13) and (14), which represent the intercooler model M5. First, the Equation (13), which is based on the mass conservation law for the air in the intercooler section, will be explained. When a total amount of air within the intercooler section is represented by M, a change (temporal change) in the total air amount M per unit time is a difference between the compressor flow-out air flow rate mcm corresponding to the flow rate of the air flowing into the intercooler section and the throttle-passing air flow rate mt corresponding to the flow rate of the air flowing out of the intercooler section. Therefore, the following Equation (15) based on the mass conservation law is obtained.

$$dM/dt=mcm-mt \quad (15)$$

In addition, the state equation is represented by the following Equation (16). Therefore, the Equation (13) based on the mass conservation law is obtained by assigning the following Equation (16) to the Equation (15) to eliminate the total air amount M and by taking into account the fact that the volume Vic of the intercooler section does not change.

$$Pic \cdot Vic = M \cdot R \cdot Tic \quad (16)$$

Next, Equation (14), which is based on the energy conservation law for the air in the intercooler section, will be explained. A change per unit time $(d(M \cdot Cv \cdot Tic)/dt)$ of the energy $M \cdot Cv \cdot Tic$ (Cv: specific heat at constant volume of air) of the air in the intercooler section is equal to a difference between the energy imparted to the air in the intercooler section per unit time and the energy taken out of (drawn from) air in the intercooler section per unit time. In the following description, it is assumed that all energy of the air in the intercooler section contributes to temperature increase (i.e., kinetic energy is ignored).

The above-mentioned energy imparted to the air in the intercooler section is the energy of the air flowing into the intercooler section.

This energy of the air flowing into the intercooler section is equal to a sum of, the energy $Cp \cdot mcm \cdot Ta$ of the air flowing into the intercooler section whose temperature is maintained at the intake-air temperature Ta under the assumption that the air is not compressed by the compressor 91a, and the compressor-imparting energy Ecm which the compressor 91a of the supercharger 91 imparts to the air flowing into the intercooler section.

Meanwhile, the above-mentioned energy taken out of (drawn from) the air in the intercooler section is equal to a sum of, the energy $Cp \cdot mt \cdot Tic$ of the air flowing out of the intercooler section, and the second energy which is an energy exchanged between the air in the intercooler 45 and the wall of the intercooler 45.

The second energy is obtained as a value $K \cdot (Tic-Ticw)$ based on the general empirical rules, the value being proportional to a difference between the temperature Tic of the air in the intercooler 45 and the temperature Ticw of the wall of the intercooler 45. Here, K is a value corresponding to a product of a surface area of the intercooler 45 and a heat transfer coefficient between the air in the intercooler 45 and the wall of the intercooler 45. As described above, the intercooler 45 cools the air in the intake passage by use of air outside the engine 10. Therefore, the temperature Ticw of the wall of the intercooler 45 is approximately equal to the temperature of the air outside the engine 10. Accordingly, the temperature Ticw of the wall of the intercooler 45 can be assumed to be equal to the intake-air temperature Ta, and thus the second energy is obtained as a value $K \cdot (Tic-Ta)$.

According to the above, the following Equation (17), which is based on the energy conservation law for the air in the intercooler section, is obtained.

$$d(M \cdot Cv \cdot Tic)/dt = Cp \cdot mcm \cdot Ta - Cp \cdot mt \cdot Tic + Ecm - K \cdot (Tic - Ta) \quad (17)$$

Incidentally, the specific heat ratio $\kappa$ is represented by the following Equation (18) and the Mayer relation is represented by the following Equation (19). Therefore, the above-mentioned Equation (14) is obtained by transforming the above-mentioned Equation (17) by use of the Equation (16) ($Pic \cdot Vic = M \cdot R \cdot Tic$), the following Equations (18) and (19). Here, the transformation is performed by taking into account the fact that the volume Vic of the intercooler section does not change.

$$\kappa = Cp/Cv \quad (18)$$

$$Cp = Cv + R \quad (19)$$

[Intake Pipe Model M6]

The intake pipe model M6 estimates the intake pipe-internal pressure Pm and the intake pipe-internal temperature Tm in accordance with the following Equations (20) and (21), which are generalized mathematical formulas representing the intake pipe model M6 and are based on the mass conservation law and the energy conservation law, respectively, and on the basis of the flow rate of air flowing into the intake pipe section (i.e., throttle-passing air flow rate) mt, the intercooler-internal temperature (i.e., throttle valve upstream temperature) Tic, and the flow rate of the air flowing out of the intake pipe section (i.e., cylinder flow-in air flow rate) mc. It should be noted that, in the following Equations (20) and (21), Vm represents a volume of the intake pipe section (the intake passage from the throttle valve 46 to the intake valve 32).

$$d(Pm/Tm)/dt = (R/Vm) \cdot (mt - mc) \quad (20)$$

$$dPm/dt = \kappa \cdot (R/Vm) \cdot (mt \cdot Tic - mc \cdot Tm) \quad (21)$$

The intake pipe model M6 applies to the right-hand sides of the Equations (20) and (21) the throttle-passing air flow rate $mt(k-1)$ obtained by the throttle model M2, the cylinder flow-in air flow rate $mc(k-1)$ obtained by the intake valve model M3, and the latest intercooler-internal temperature (throttle valve upstream temperature) $Tic(k)$ estimated by the intercooler model M5. The intake pipe model M6 estimates a latest intake pipe-internal pressure $Pm(k)$ and a latest intake pipe-internal temperature $Tm(k)$ based on the calculation using the Equations (20) and (21).

[Intake Valve Model M7]

The intake valve model M7 includes a model similar to the above-mentioned intake valve model M3. The intake valve model M7 obtains a latest cylinder flow-in air flow rate $mc(k)$ by applying to the Equation (5) ($mc = (Tic/Tm) \cdot (c \cdot Pm - d)$), which is a generalized mathematical formula representing the intake valve model M7 and is based on the above-mentioned empirical rules, the latest intake pipe-internal pressure $Pm(k)$ and the latest intake pipe-internal temperature $Tm(k)$ both of which are estimated by the intake pipe model M6, and the latest intercooler-internal temperature $Tic(k)$ estimated by the intercooler model M5. Subsequently, the intake valve model M7 obtains a predicted cylinder intake-air quantity KLfwd, which is a cylinder intake-air quantity estimated by multiplying the obtained cylinder flow-in air flow rate $mc(k)$ by a time Tint, which is a period of time from the point in time when the intake valve 32 opens to the point in time when the intake valve 32 closes. The time Tint is calculated based on the engine rotational speed NE at the present point in time and the open-close timing VT of the intake valve 32 at the present point in time.

Next, actual operation of the electric control unit 70 will be described with reference to FIGS. 8 to 12.

[Estimation of Throttle Valve Opening]

Figure 8:
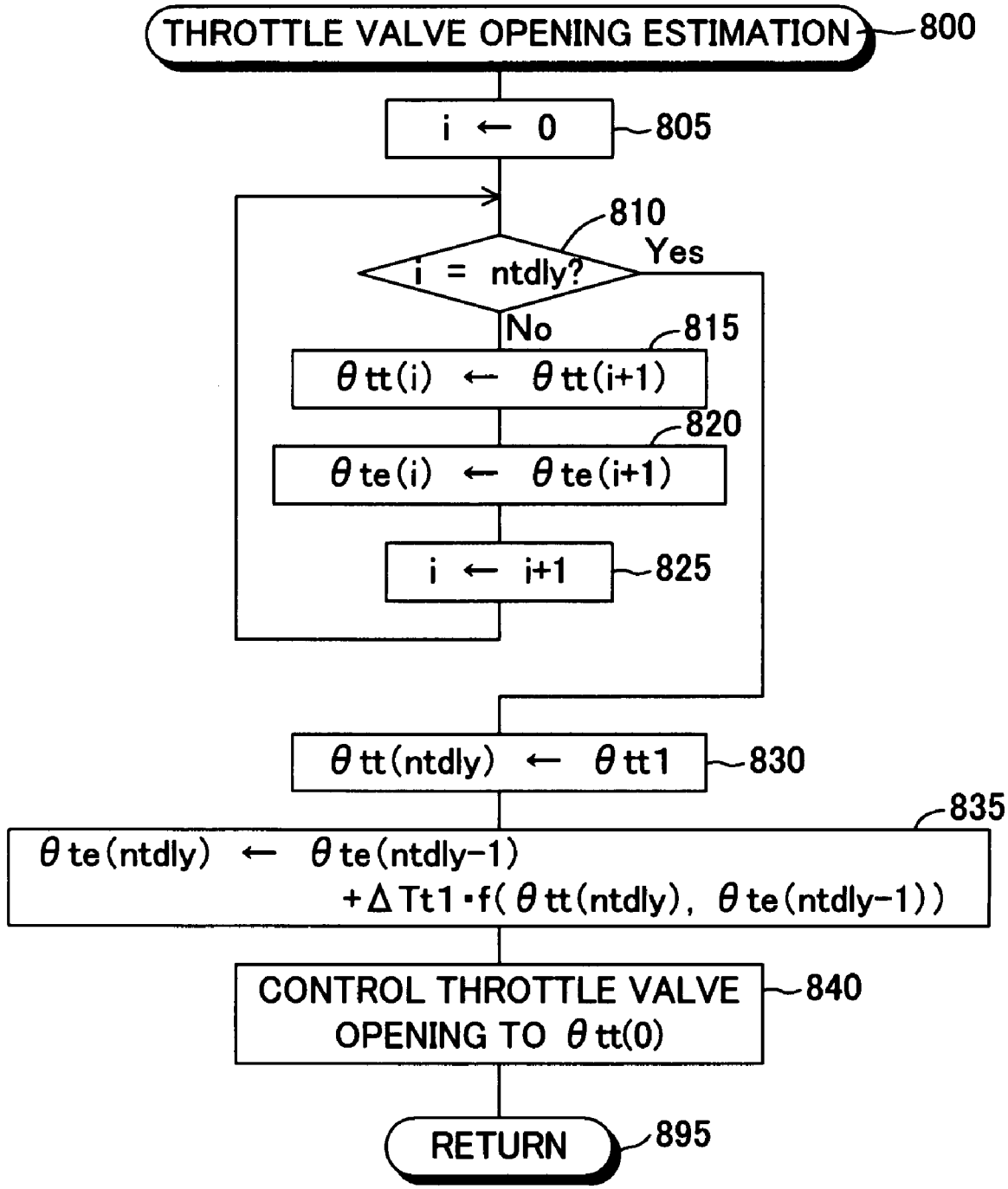
FIG. 8 is a flowchart showing a program which the CPU shown in FIG. 1 executes so as to estimate (or predict) the throttle valve opening.

The CPU 71 accomplishes functions of the electronic-control throttle valve model M1 and the electronic-control throttle valve logic A1 by executing a throttle valve opening estimation routine, shown by a flowchart in FIG. 8, every time a predetermined computation interval $\Delta Tt1$ (in the present example, 2 ms) elapses. Specifically, the CPU 71 starts a processing from Step 800 at a predetermined timing, and then, proceeds to Step 805 so as to assign zero to a variable i. Subsequently, the CPU 71 proceeds to Step 810 to determine whether or not the variable i is equal to a delay cycle number ntdly. This delay cycle number ntdly is a value (in the present example, 32) which is obtained by dividing the delay time TD (in the present example, 64 ms) by the computation interval $\Delta Tt1$.

Since the variable i is zero at the present point in time, the CPU 71 makes a determination of "No" in Step 810. Then, the CPU 71 proceeds to Step 815 to store a value of a target throttle valve opening θtt(i+1) into a memory location for a target throttle valve opening θtt(i), and stores in subsequent Step 820 a value of a predicted throttle valve opening θte(i+1) into a memory location for a predicted throttle valve opening θte(i). Through the above-described processing, the value of the target throttle valve opening θtt(1) is stored into the memory location for the target throttle valve opening θtt(0), and the value of the predicted throttle valve opening θte(1) is stored into the memory location for the predicted throttle valve opening θte(0).

Next, the CPU 71 increments the value of the variable i by "1" in Step 825, and then returns to the Step 810. Thereafter, as long as the value of the variable i is smaller than the delay cycle number ntdly, the CPU 71 again executes the Steps 815 to 825. That is, the Steps 815 to 825 are repeatedly executed until the value of the variable i becomes equal to the delay cycle number ntdly. Thus, the value of the target throttle valve opening θtt(i+1) is successively shifted to the memory location for the target throttle valve opening θtt(i), and the value of the predicted throttle valve opening θte(i+1) is successively shifted to the memory location for the predicted throttle valve opening θte(i).

When the value of variable i becomes equal to the delay cycle number ntdly as a result of repetition of the above-described Step 825, the CPU 71 makes a determination of "Yes" in the Step 810. Then, the CPU 71 proceeds to Step 830 to obtain a present provisional target throttle valve opening θtt1 on the basis of the accelerator pedal operation amount Accp at the present point in time and a table shown in FIG. 3, and stores the obtained present provisional target throttle valve opening θtt1 into a memory location for a target throttle valve opening θtt(ntdly) so that the present provisional target throttle valve opening θtt1 becomes a target throttle valve opening θtt after the delay time TD.

Next, the CPU 71 proceeds to Step 835 and calculates a predicted throttle valve opening θte(ntdly) after elapse of the delay time TD from the present point in time on the basis of a predicted throttle valve opening θte(ntdly−1), the target throttle valve opening θtt(ntdly), and an equation shown in the box of the Step 835, which is based on the Equation (1) (the right-hand side thereof). The predicted throttle valve opening θte(ntdly−1) was stored at the previous timing of computation as a predicted throttle valve opening θte after elapse of the delay time TD from the previous timing of computation. The target throttle valve opening θtt(ntdly) was stored in the above-mentioned Step 830 as the target throttle valve opening θtt after elapse of the delay time TD. Subsequently, in Step 840, the CPU 71 sends a drive signal to the throttle valve actuator 46a in order to make the actual throttle valve opening θta coincide with the target throttle valve opening θtt(0), and then, the CPU 71 proceeds to Step 895 to end the current execution of the present routine tentatively.

As described above, in a memory (RAM 73) for the target throttle valve opening θtt, each of the values of the target throttle valve opening θtt stored in the memory is shifted, one at a time, every time the present routine is executed. As a result, the value stored in the memory location for the target throttle valve opening θtt(0) is used as the target throttle valve opening θtt which is output to the throttle valve actuator 46a by the electronic-control throttle valve logic A1. That is, the value stored in the memory location for the target throttle valve opening θtt(ntdly) at the current execution of the present routine is stored in the memory location for the target throttle valve opening θtt(0) when the present routine is executed repeatedly the delay cycle number ntdly times (i.e., after the delay time TD). Also, in a memory for the predicted throttle valve opening θte, a predicted throttle valve opening θte after elapse of a predetermined time (m·ΔTt) from the present point in time is stored in the memory location for θte(m). The value m in this case is an integer between 0 and the ntdly.

[Estimation of Cylinder Intake-Air Quantity]

Figure 9:
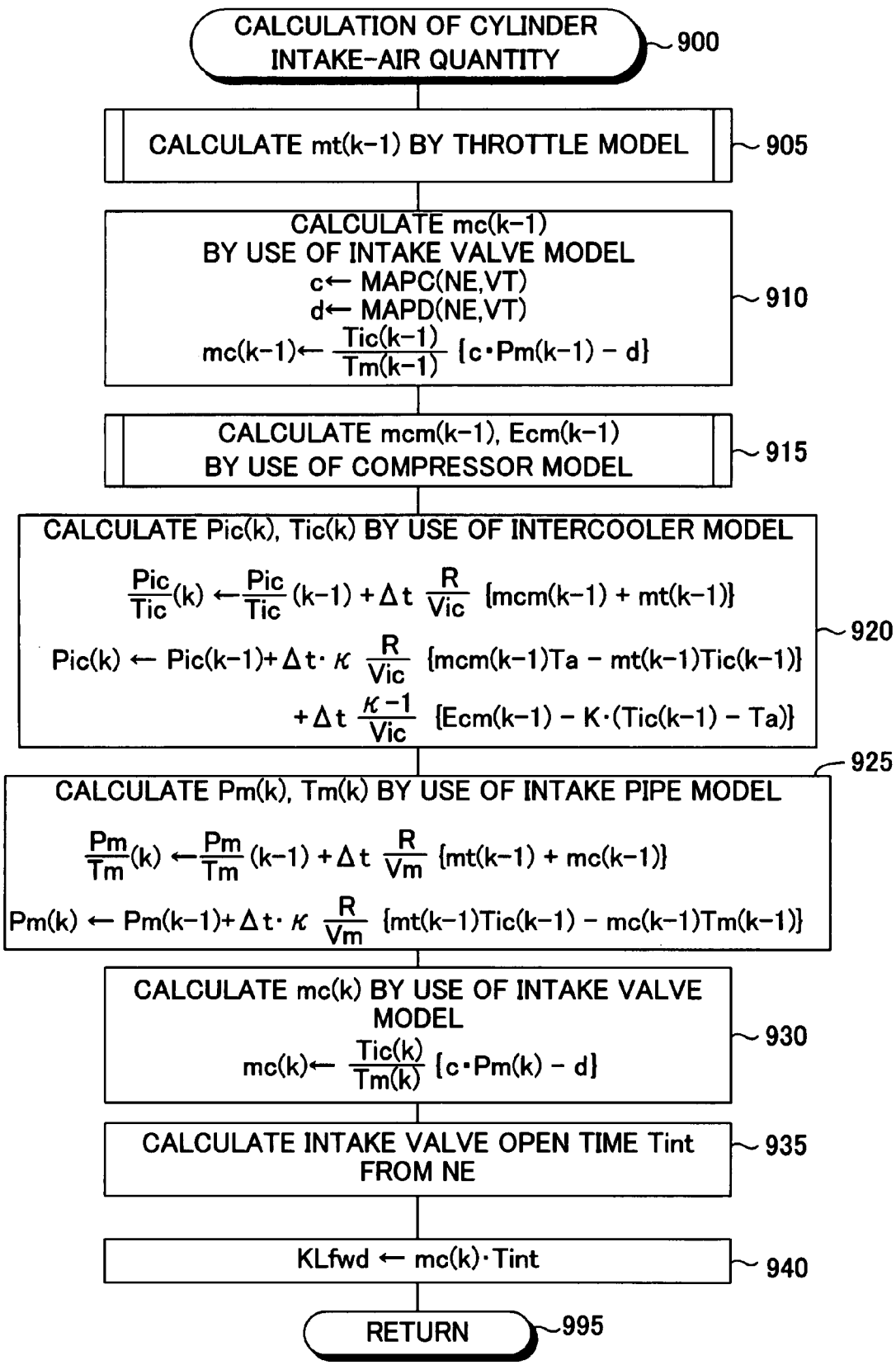
FIG. 9 is a flowchart showing a program which the CPU shown in FIG. 1 executes so as to estimate the cylinder intake-air quantity.
Figure 10:
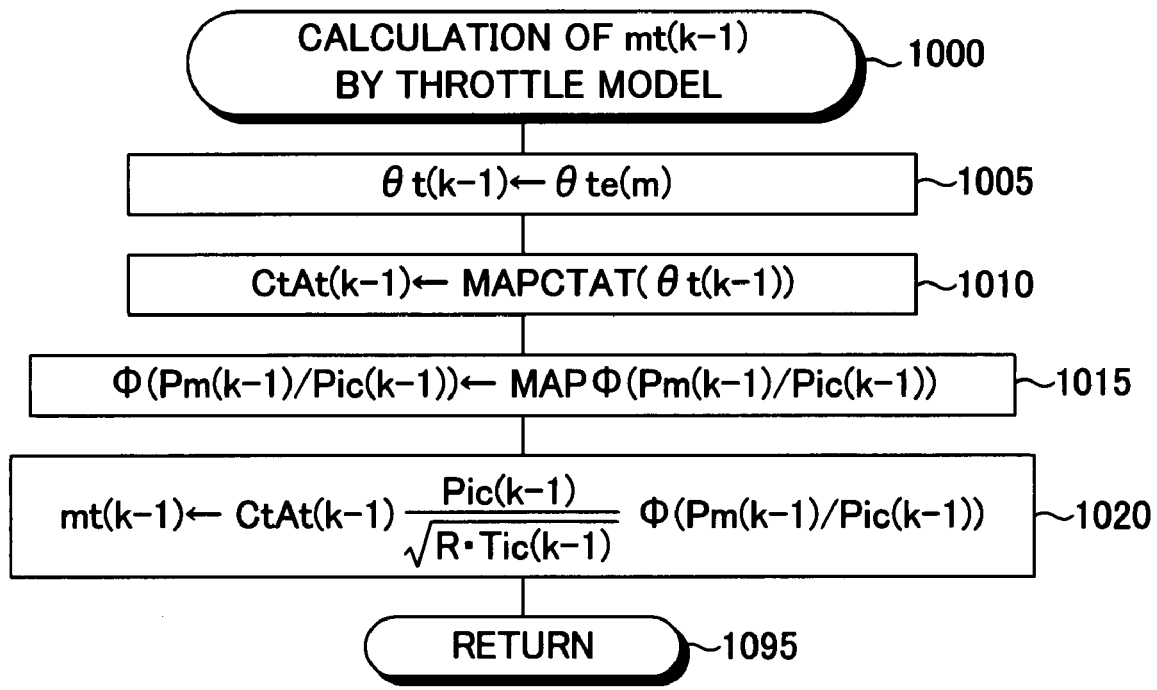
FIG. 10 is a flowchart showing a program which the CPU shown in FIG. 1 executes so as to estimate a throttle-passing air flow rate.
Figure 11:
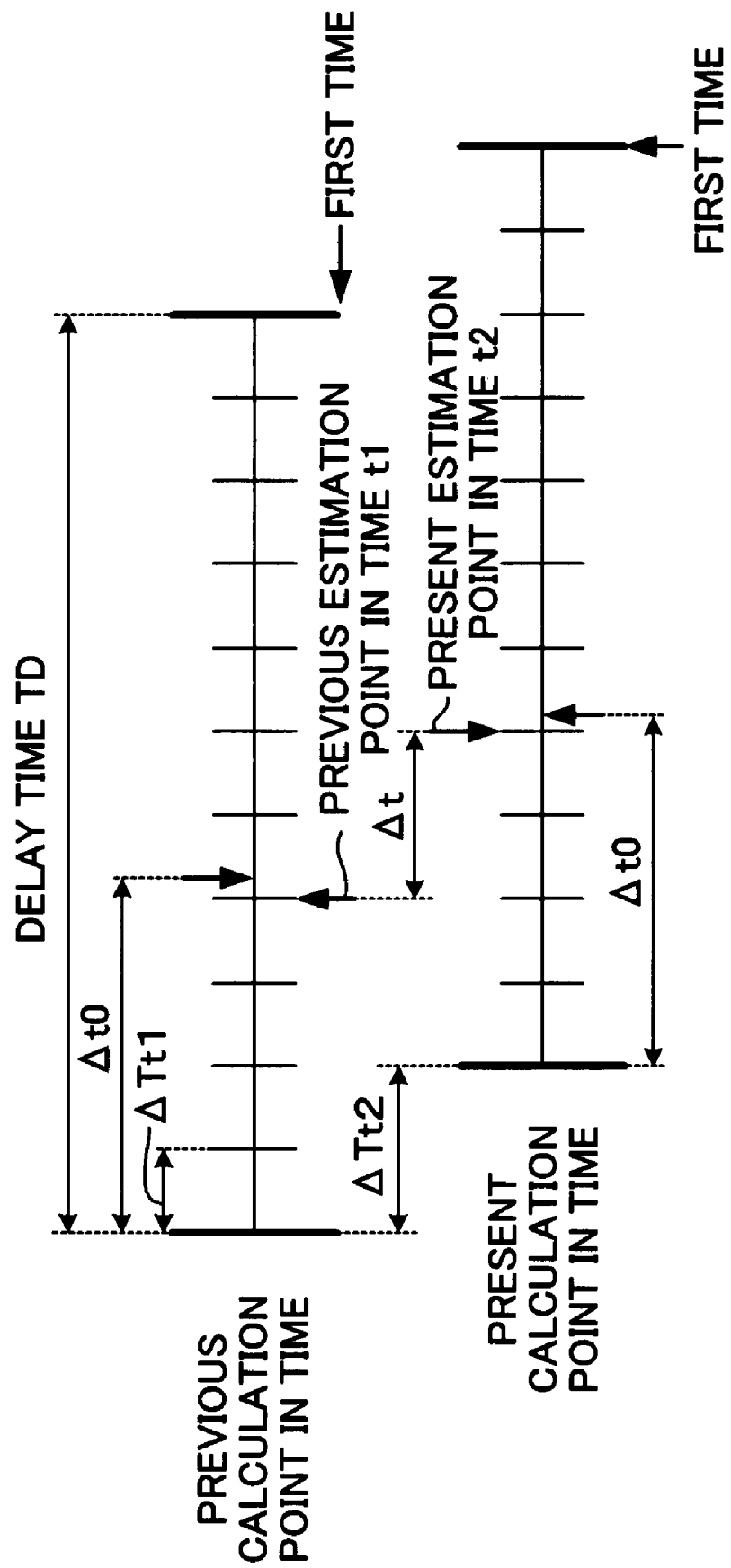
FIG. 11 is an illustration showing a relation among a first point in time, a predetermined time interval $\Delta t0$, a previous estimation point in time t1, and a present estimation point in time t2.

Meanwhile, the CPU 71 estimates a cylinder intake-air quantity at a future point in time later than (after) the present point in time by executing a cylinder intake-air quantity estimation routine, shown by a flowchart in FIG. 9, every time a predetermined computation interval ΔTt2 (in the present example, 8 ms) elapses. Specifically, at a predetermined timing, the CPU 71 starts a processing from Step 900, and proceeds to Step 905 in which the CPU 71 proceeds to Step 1000 shown in a flowchart in FIG. 10 in order to obtain the throttle-passing air flow rate mt(k−1) by the above-mentioned throttle model M2.

Subsequently, the CPU 71 proceeds to Step 1005, and inputs (selects), as the predicted throttle valve opening θt(k−1), the predicted throttle valve opening θte(m) estimated as the throttle valve opening at a point in time closest to a point in time which is later than the present point in time by a predetermined time interval Δt0 (in the present example, the time interval Δt0 being a time period from a predetermined point in time before the fuel injection start time of a specific cylinder (the last point in time before which the fuel injection amount must be determined) to a point in time at which the intake valve 32 closes in the intake stroke of the specific cylinder (the second point in time))), out of the θte(m) (m is an integer between 0 and ntdly) stored in the memory by the throttle valve opening estimation routine of FIG. 8. In the following description, for the purpose of simplification, a point in time corresponding to the above-mentioned predicted throttle valve opening θt(k−1) at the previous timing of computation will be referred to as a "previous estimation point in time t1", and a point in time corresponding to the predicted throttle valve opening θt(k−1) at the present timing of computation will be referred to as a "present estimation point in time t2" (see FIG. 11, which is a schematic diagram showing the relation among the first point in time, the predetermined time interval Δt0, the previous estimation point in time t1, and the present estimation point in time t2).

The CPU 71 then proceeds to step 1010 so as to obtain the Ct(θt)·At(θt) for the Equation (2) on the basis of the table MAPCTAT and the predicted throttle valve opening θt(k−1).

Next, the CPU 71 proceeds to step 1015, and obtains the value Φ(Pm(k−1)/Pic(k−1)) on the basis of the above-mentioned table MAPΦ and the value Pm(k−1)/Pic(k−1) which is obtained by dividing the intake pipe-internal pressure Pm(k−1) at the previous estimation point in time t1 by the intercooler-internal pressure Pic(k−1) at the previous estimation point in time t1. The intake pipe-internal pressure Pm(k−1) was obtained in Step 925 described later at the time of the previous execution of the routine of FIG. 9. The intercooler-internal pressure Pic(k−1) was obtained in Step 920 described later at the time of the previous execution of the routine of FIG. 9.

The CPU 71 then proceeds to Step 1020 so as to obtain the throttle-passing air flow rate mt(k−1) at the previous estimation point in time t1 on the basis of, the values obtained in the Steps 1010 and 1015;

an expression, shown in the box of the Step 1020, which is based on the Equation (2) representing the throttle model M2; and the intercooler-internal pressure Pic(k−1) at the previous estimation point in time t1 as well as the intercooler-internal temperature Tic(k−1) at the previous estimation point in time t1 both of which were obtained in the Step 920 described later at the time of the previous execution of the routine of FIG. 9.

Subsequently, the CPU 71 proceeds to Step 910 of FIG. 9 via Step 1095.

In the Step 910, the CPU 71 obtains the coefficient c of the Equation (5) representing the intake valve model M3 based on the table MAPC, the engine rotational speed NE at the present point in time, and the open-close timing VT of the intake valve 32 at the present point in time. Similarly, the CPU 71 obtains the value d based on the table MAPD, the engine rotational speed NE at the present point in time, and the open-close timing VT of the intake valve 32 at the present point in time. In addition, in the Step 910, the CPU 71 obtains the cylinder flow-in air flow rate mc(k−1) at the previous estimation point in time t1 in accordance with a formula shown in the Step 910 based on the Equation (5) representing the intake valve model M3, the intercooler-internal temperature Tic(k−1) at the previous estimation point in time t1 obtained in Step 920 described later at the time of previous execution of the present routine, and the intake pipe-internal pressure Pm(k−1) at the previous estimation point in time t1 as well as the intake pipe-internal temperature Tm(k−1) at the previous estimation point in time t1 both of which were obtained in Step 925 described later at the time of previous execution of the present routine.

Figure 12:
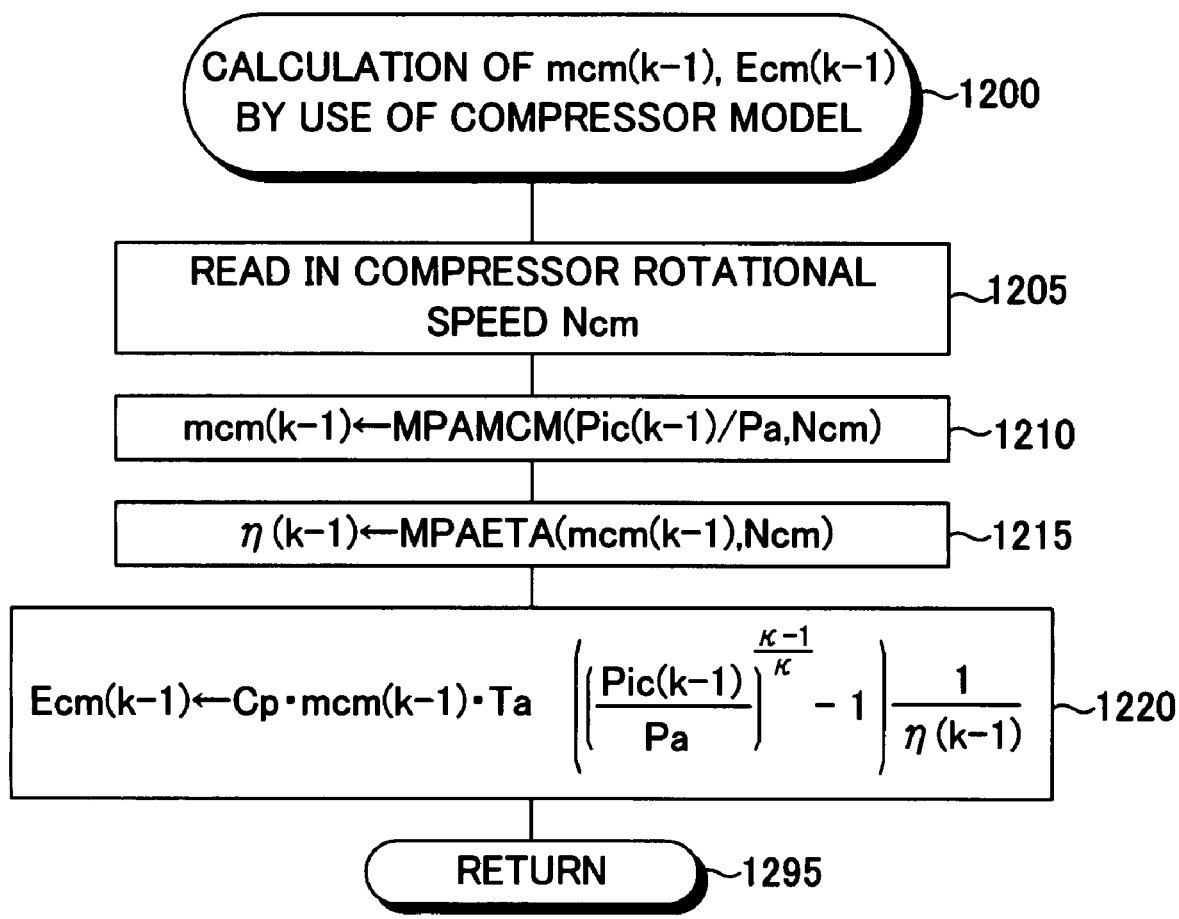
FIG. 12 is a flowchart showing a program which the CPU shown in FIG. 1 executes so as to estimate the compressor flow-out air flow rate and a compressor-imparting energy.

Next, the CPU 71 proceeds to proceeds to Step 1200 shown in a flowchart of FIG. 12 through Step 915 in order to obtain the compressor flow-out air flow rate mcm(k−1) and the compressor-imparting energy Ecm(k−1) by the compressor model M4.

Next, the CPU 71 proceeds to Step 1205 to read the compressor rotational speed Ncm detected by the compressor rotational speed sensor 63. The CPU 71 then proceeds to Step 1210 to obtain the compressor flow-out air flow rate mcm(k−1) at the previous estimation point in time t1 from the table MAPMCM, the value Pic(k−1)/Pa, which is a value obtained by dividing the intercooler-internal pressure Pic(k−1) at the previous estimation point in time t1 which was obtained in Step 920 described later at the time of previous execution of the routine of FIG. 9 by the intake-air pressure Pa at the present point in time, and the compressor rotational speed Ncm read in Step 1205.

The CPU 71 then proceeds to Step 1215 to obtain the compressor efficiency η(k−1) from the table MAPETA, the compressor flow-out air flow rate mcm(k−1) obtained in Step 1210, and the compressor rotational speed Ncm read in Step 1205.

Subsequently, the CPU 71 proceeds to Step 1220 to obtain the compressor-imparting energy Ecm(k−1) at the previous estimation point in time t1 in accordance with a formula shown in the Step 1220 based on the Equation (8) representing a portion of the compressor model M4, the value Pic(k−1)/Pa which is a value obtained by dividing the intercooler-internal pressure Pic(k−1) at the previous estimation point in time t1 obtained in Step 920 described later at the time of previous execution of the routine of FIG. 9 by the intake-air pressure Pa at the present point in time, the compressor flow-out air flow rate mcm(k−1) obtained in Step 1210, the compressor efficiency η(k−1) obtained in Step 1215, and the intake-air temperature Ta at the present point in time. The CPU 71 then proceeds to the Step 920 of FIG. 9 via Step 1295.

In the Step 920, the CPU 71 obtains the intercooler-internal pressure Pic(k) at the present estimation point in time t2 and the value {Pic/Tic}(k), which is a value obtained by dividing the intercooler-internal pressure Pic(k) by the intercooler-internal temperature Tic(k) at the present estimation point in time t2, in accordance with, formulas (differential equations) shown in the Step 920, which are obtained by discretizing Equations (13) and (14) representing the intercooler model M5, the throttle-passing air flow rate mt(k−1) obtained in Steps 905, and the compressor flow-out air flow rate mcm(k−1) as well as compressor-imparting energy Ecm(k−1) both of which were obtained in Step 915.

It should be noted that Δt represents a discrete interval used in the intercooler model M5 and the intake pipe model M6 described later, and is represented by an equation (Δt=t2−t1). That is, in Step 920, the intercooler-internal pressure Pic(k) at the present estimation point in time t2 and the intercooler-internal temperature Tic(k) at the present estimation point in time t2 are obtained from the intercooler-internal pressure Pic(k−1) at the previous estimation point in time t1 and the intercooler-internal temperature Tic(k−1) at the previous estimation point in time t1 and so forth.

Next, the CPU 71 proceeds to Step 925 to obtain the intake pipe-internal pressure Pm(k) at the present estimation point in time t2 and the value {Pm/Tm}(k), which is a value dividing the intake pipe-internal pressure Pm(k) by the intake pipe-internal temperature Tm(k) at the present estimation point in time t2, in accordance with formulas (differential equations) shown in Step 925, which are obtained by discretizing Equations (20) and (21) representing the intake pipe model M6, the throttle-passing air flow rate mt(k−1) and the cylinder flow-in air flow rate mc(k−1) obtained in the above-mentioned Steps 905 and 910, respectively, and the intercooler-internal temperature Tic(k−1) at the previous estimation point in time t1 which was obtained in Step 920 at the time of previous execution of the present routine.

That is, in the Step 925, the intake pipe-internal pressure Pm(k) at the present estimation point in time t2 and the intake pipe-internal temperature Tm(k) at the present estimation point in time t2 are obtained from the intake pipe-internal pressure Pm(k−1) at the previous estimation point in time t1 and the intake pipe-internal temperature Tm(k−1) at the previous estimation point in time t1 and so forth.

Subsequently, in Step 930, the CPU 71 obtains the cylinder flow-in air flow rate mc(k) at the present estimation point in time t2 by use of the Equation (5) representing the intake valve model M7. At this time, the coefficient c and value d obtained in the Step 910 are used. Values (latest values) at the present estimation point in time t2 obtained in Steps 920 and 925 are used for the intercooler-internal temperature Tic (k), the intake pipe-internal pressure Pm(k), and the intake pipe-internal temperature Tm(k).

The CPU 71 then proceeds to Step 935 so as to calculate an intake valve open time (a period of time from the point in time when the intake valve 32 opens to the point in time when the intake valve 32 closes) Tint based on the engine rotational speed NE at the present point in time and the open-close timing VT of the intake valve 32 at the present point in time. In Step 940 subsequent thereto, the CPU 71 obtains the predicted cylinder intake-air quantity KLfwd by multiplying the cylinder flow-in air flow rate mc(k) at the present estimation point in time t2 by the intake valve open time Tint. The CPU 71 then proceeds to Step 995 so as to end the current execution of the present routine tentatively.

As is described above, the compressor flow-out air flow rate mcm (k−1) at the previous estimation point in time t1 and the compressor-imparting energy Ecm (k−1) at the previous estimation point in time t1 are estimated on the basis of the detected compressor rotational speed Ncm. Next, on the basis of the estimated compressor flow-out air flow rate mcm (k−1) and the compressor-imparting energy Ecm (k−1), the intercooler-internal pressure Pic (k) at the present estimation point in time t2 and the intercooler-internal temperature Tic (k) at the present estimation point in time t2 are estimated, the present estimation point in time t2 coming later than the previous estimation point in time t1 by a minute time Δt. Subsequently, the predicted cylinder intake-air quantity KLfwd at the present estimation point in time t2 is estimated on the basis of the estimated intercooler-internal pressure Pic (k) and the intercooler-internal temperature Tic (k).

The predicted cylinder intake-air quantity KLfwd calculated as described above will be described further. Here, in order to simplify the description, a case is assumed where the computation interval ΔTt2 of the cylinder intake-air quantity estimation routine of FIG. 9 is sufficiently shorter than a period during which the crankshaft 24 rotates by 360 degrees and where the predetermined time interval Δt0 does not change greatly. In this case, the present estimation point in time t2 steps forward to a future point in time by an amount approximately equal to the computation interval ΔTt2 every time the cylinder intake-air quantity estimation routine is executed. When the cylinder intake-air quantity estimation routine is executed at a predetermined point in time immediately before the fuel injection start timing for a specific cylinder (last point in time before which an amount of fuel to be injected must be determined), the present estimation point in time t2 approximately coincides with the second point in time (the point in time at which the intake valve 32 closes in the intake stroke of the specific cylinder). Accordingly, the predicted cylinder intake-air quantity KLfwd calculated at this point in time coincides with an estimated value of the cylinder intake-air quantity at the above-mentioned second point in time.

As described above, the air quantity estimation apparatus for the internal combustion engine according to the embodiment of the present invention, estimates the pressure and the temperature of the air in the intercooler 45 as the pressure and the temperature of the air in the intake passage at the position upstream of the throttle valve 46 (the throttle valve upstream air), respectively, in consideration of the compressor-imparting energy (the first energy) which the compressor 91a of the supercharger 91 imparts to the air supplied (flowing) into the intercooler 45 and the second energy exchanged between the wall of the intercooler 45 and the air in the intercooler 45. Thus, the pressure and the temperature of the throttle valve upstream air are estimated with high accuracy, because the compression-work amount of the supercharger 91 and the heat-transfer amount between the wall of the intercooler 45 and the air are taken into consideration. The above-mentioned embodiment estimates the cylinder intake-air quantity on the basis of the estimated pressure and the estimated temperature of the throttle valve upstream air. Accordingly, it is possible to accurately estimate an amount (a quantity) of air introduced into the cylinder of the internal combustion engine 10 (cylinder intake-air quantity).

Further, the above embodiment estimates the compressor-imparting energy on the basis of the compressor rotational speed (rotational speed of the compressor 91a of the supercharger 91) representing an operation state of the supercharger. Accordingly, even when the operation state of the supercharger 91 changes, it is possible to accurately estimate the pressure and the temperature of the throttle valve upstream air (air within the intercooler 45).

In addition, the above embodiment estimates the compressor-imparting energy at the future point in time which is later than the present point in time on the basis of the compressor rotational speed at the present point in time detected by the compressor rotational speed sensor 63. Accordingly, in the internal combustion engine comprising a supercharger, it is possible to accurately estimate the pressure and the temperature of the throttle valve upstream air at the future point in time later than the present point in time without estimating the operation state of the supercharger 91 at the future point in time by use of a supercharger model which would generally tend to be complex. As a result, it is possible to accurately estimate the cylinder intake-air quantity at the future point in time.

It should be noted that the present invention is not limited to the above embodiment, and various modifications may be employed within the scope of the present invention. For example, in the above embodiment, the delay time TD is constant. However, the delay time TD may be a varying time in accordance with the engine rotational speed NE, such as a time T270 that is necessary for the engine 10 in rotating by a predetermined crank angle (e.g., 270° in crank angle).

In the above embodiment, the intercooler 45 is an air-cooling type intercooler. However, the intercooler 45 may be a water-cooling type intercooler which cools air flowing through the intake passage by circulating cooling water. In this case, the air quantity estimation apparatus may include a water temperature sensor for detecting the temperature Tw of the cooling water, and obtain the energy (the second energy) exchanged between the air within the intercooler 45 and the wall of the intercooler 45 on the basis of the cooling water temperature Tw detected by the water temperature sensor. That is, in the intercooler model M5, the following Equation (22) is used, in place of the Equation (14).

$$dPic/dt = \kappa \cdot (R/Vic) \cdot (mcm \cdot Ta - mt \cdot Tic) + (\kappa-1)/(Vic) \cdot (mcm - K \cdot (Tic - Tw)) \qquad (22)$$

Moreover, in the above embodiment, a supercharger is a turbocharger. However, a supercharger may be a mechanical or electrical supercharger in place of the turbocharger.

What is claimed is:

1. An air quantity estimation apparatus for an internal combustion engine having an intake passage for introducing air taken from outside of the engine into a cylinder; a throttle valve which is disposed in said intake passage and whose opening is adjustable for changing quantity of air passing through the intake passage; a supercharger including a compressor disposed in said intake passage at a position upstream of said throttle valve for compressing the air in said intake passage; and an intercooler disposed in said intake passage between said throttle valve and said supercharger for cooling air in said intake passage, the air quantity estimation apparatus comprising:

an intercooler-internal air condition estimation means for estimating pressure and temperature of the air in the intercooler as pressure and temperature of throttle valve upstream air which is air at a position upstream of said throttle valve in said intake passage, respectively, by use of an intercooler model configured on the basis of an energy conversation law with respect to the air in the intercooler, the intercooler model being designed in consideration of a first energy imparted by said supercharger to air supplied into said intercooler, and a second energy exchanged between a wall of the intercooler and the air in the intercooler; and a cylinder intake-air quantity estimation means for estimating, on the basis of the estimated pressure of the throttle valve upstream air and the estimated temperature of the throttle valve upstream air, cylinder intake-air quantity which is quantity of air introduced into said cylinder.

2. The air quantity estimation apparatus for the internal combustion engine according to claim 1, wherein said intercooler-internal air condition estimation means is configured so as to estimate said first energy on the basis of a rotational speed of the compressor of said supercharger.

3. The air quantity estimation apparatus for the internal combustion engine according to claim 2, further comprising a compressor rotational speed-detection means for detecting said rotational speed of the compressor of the supercharger;

said intercooler-internal air condition estimation means is configured so as to estimate said first energy at a future point in time later than a present point in time on the basis of said detected rotational speed of the compressor, and to estimate, by adopting the estimated first energy at the future point in time as said first energy which is used in said intercooler model, the pressure and the temperature of the air in the intercooler at the future point in time as the pressure and the temperature of the throttle valve upstream air at the future point in time, respectively; and said cylinder intake-air quantity estimation means is configured so as to estimate the cylinder intake-air quantity at the future point in time on the basis of the estimated pressure and the estimated temperature of the throttle valve upstream air at the future point in time.

* * * * *